US012681916B2

(12) United States Patent　　　(10) Patent No.:　US 12,681,916 B2
Lee et al.　　　　　　　　　　　　(45) Date of Patent:　　Jul. 14, 2026

(54) DATABASE WORKLOAD CAPTURE AND REPLAY USING OPTIMIZED DEPENDENCY GRAPHS

(71) Applicant: SAP SE, Walldorf (DE)

(72) Inventors: Wonseok Lee, Pohang (KR); Jaehyun Ha, Pohang (KR); Changgyoo Park, Berlin (DE); Myunggon Park, Mississauga (CA); Juhyeng Han, Suwon (KR); Juchang Lee, Seoul (KR)

(73) Assignee: SAP SE, Walldorf (DE)

( * ) Notice: Subject to any disclaimer, the term of this patent is extended or adjusted under 35 U.S.C. 154(b) by 14 days.

(21) Appl. No.: 18/827,182

(22) Filed: Sep. 6, 2024

(65) Prior Publication Data

US 2025/0265238 A1　　Aug. 21, 2025

Related U.S. Application Data

(60) Provisional application No. 63/555,640, filed on Feb. 20, 2024.

(51) Int. Cl.
　　*G06F 16/23*　　　　(2019.01)
　　*G06F 16/901*　　　(2019.01)
(52) U.S. Cl.
　　CPC ...... *G06F 16/2358* (2019.01); *G06F 16/9024* (2019.01)
(58) Field of Classification Search
　　None
　　See application file for complete search history.

(56)　　　　　References Cited

U.S. PATENT DOCUMENTS

2012/0221519 A1*　8/2012　Papadomanolakis ......................... G06F 11/3688 707/610
2017/0123877 A1*　5/2017　Gongloor ............ G06F 11/3466
2018/0013692 A1*　1/2018　Park ...................... H04L 67/535
2019/0311057 A1*　10/2019　Sung ................. G06F 16/24542
2019/0347348 A1*　11/2019　Park ................... G06F 16/2365
2022/0182294 A1*　6/2022　Li ........................ H04L 41/0893

OTHER PUBLICATIONS

Lee, Wonseok, et al., "DoppelGanger++: Towards Fast Dependency Graph Generation for Database Replay", Proc. ACM Manag. Data, vol. 2, No. 1 (SIGMOD), Article 67, published Feb. 2024, 26 pages. (Year: 2024).*

* cited by examiner

*Primary Examiner* — Scott A. Waldron
(74) *Attorney, Agent, or Firm* — Klarquist Sparkman, LLP

(57)　　　　　ABSTRACT

Techniques and solutions are provided for providing improved replay of a database workload. In particular, the present disclosure provides techniques for generating dependency graphs that have a reduced number of redundant edges. In particular, the dependency graphs can be generated using a technique that removes subpaths of a larger path of requests for database operations that access a common database object. Another technique removes subpaths of a larger path the incudes additional requests in multiple sessions, even if some requests access different database objects. Particular implementations process a set of requests to generate state information, where the state information can be used in generating a dependency graph that excludes one more types of redundant edges. Additional efficiency is provided in that graphs can be generated using a single scan of a given request.

20 Claims, 12 Drawing Sheets

200
SOURCE 210
CLIENTS 215
APPLICATION SERVERS 220
FIRST DATABASE SYSTEM 225
TEST 230
EMULATED WORKLOAD 235
APPLICATION SERVERS 240
SECOND DATABASE SYSTEM 245
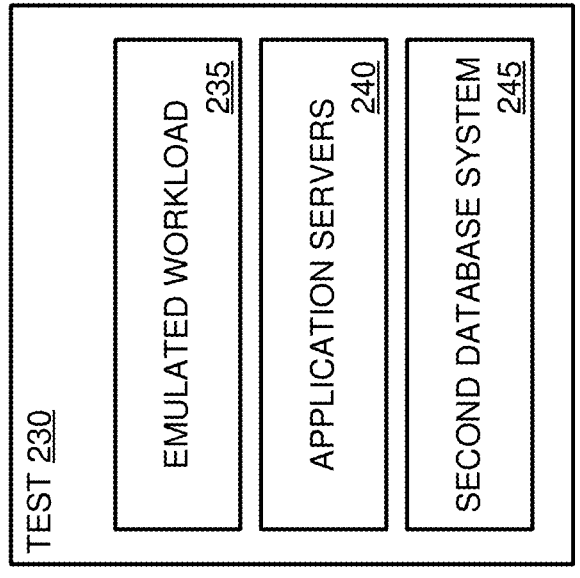
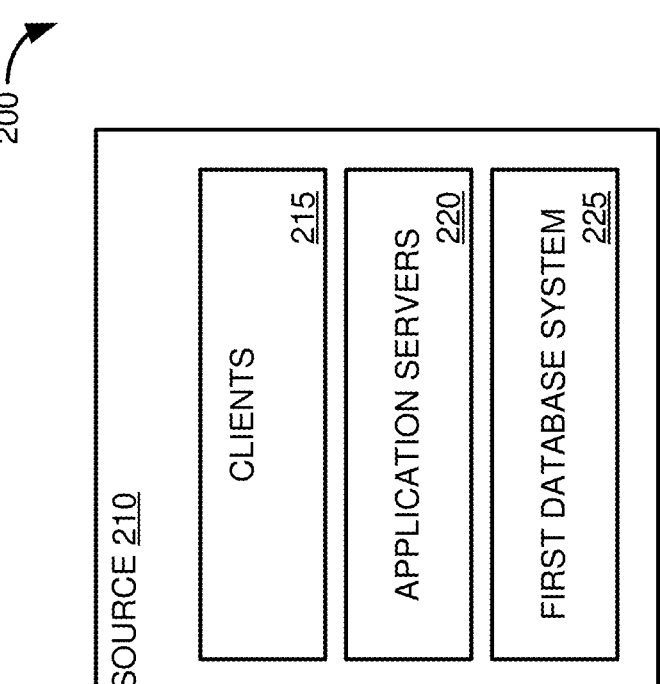
FIG. 2 (Prior Art)

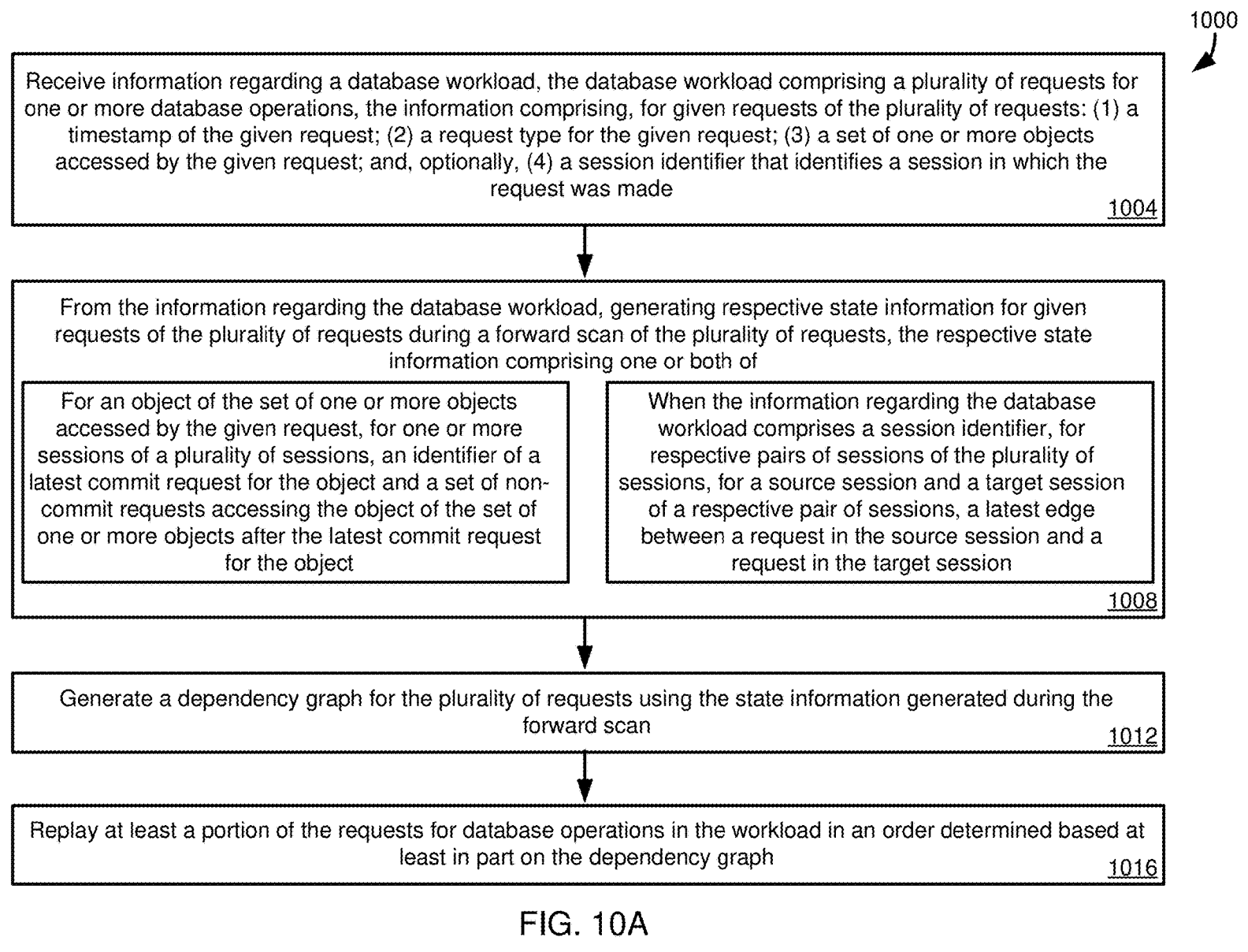

1000

Receive information regarding a database workload, the database workload comprising a plurality of requests for one or more database operations, the information comprising, for given requests of the plurality of requests: (1) a timestamp of the given request; (2) a request type for the given request; (3) a set of one or more objects accessed by the given request; and, optionally, (4) a session identifier that identifies a session in which the request was made
1004

From the information regarding the database workload, generating respective state information for given requests of the plurality of requests during a forward scan of the plurality of requests, the respective state information comprising one or both of For an object of the set of one or more objects accessed by the given request, for one or more sessions of a plurality of sessions, an identifier of a latest commit request for the object and a set of non-latest commit requests for the object and a set of the set of one or more objects accessing the object of the set of one or more objects after the latest commit request for the object When the information regarding the database workload comprises a session identifier, for respective pairs of sessions of the plurality of sessions, for a source session and a target session of a respective pair of sessions, a latest edge between a request in the source session and a request in the target session
1008

Generate a dependency graph for the plurality of requests using the state information generated during the forward scan
1012

Replay at least a portion of the requests for database operations in the workload in an order determined based at least in part on the dependency graph
1016

FIG. 10A

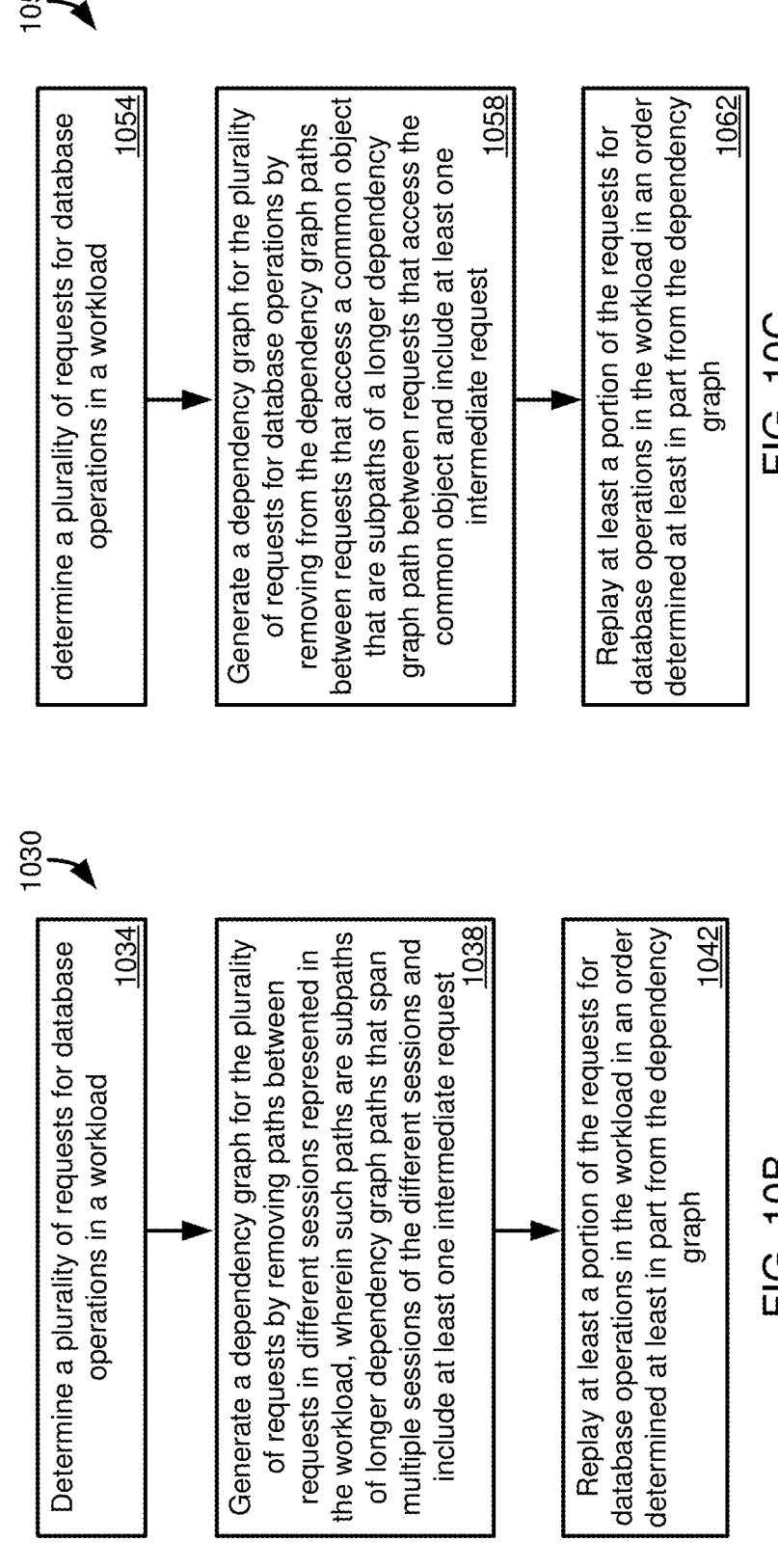

determine a plurality of requests for database operations in a workload    1054

Generate a dependency graph for the plurality of requests for database operations by removing from the dependency graph paths between requests that access a common object that are subpaths of a longer dependency graph path between requests that access the common object and include at least one intermediate request    1058

Replay at least a portion of the requests for database operations in the workload in an order determined at least in part from the dependency graph    1062

Determine a plurality of requests for database operations in a workload    1034

Generate a dependency graph for the plurality of requests by removing paths between requests in different sessions represented in the workload, wherein such paths are subpaths of longer dependency graph paths that span multiple sessions of the different sessions and include at least one intermediate request    1038

Replay at least a portion of the requests for database operations in the workload in an order determined at least in part from the dependency graph    1042

FIG. 10B

SOFTWARE 1180 IMPLEMENTING DESCRIBED TECHNOLOGIES

DATABASE WORKLOAD CAPTURE AND REPLAY USING OPTIMIZED DEPENDENCY GRAPHS

The present disclosure generally relates to capturing and replaying a database workload. Particular implementations relate to dependency graphs that are optimized through the removal of redundant edges.

BACKGROUND

Database replay systems (DRSs) test relational database systems in a test system. DRSs capture workloads on a production system and then replay them in the test system to test various system changes (such as hardware/software upgrades) and to avoid risks such as (a) performance regression, (b) bugs, or (c) new resource contention points before releasing them in production. In typical implementations, a workload includes user requests, each containing a SQL statement associated with session ID.

Output determinism helps ensure that the replay of a captured workload produces the same output as the original run, even when physical plans for the workload change due to hardware or software updates. The relative ordering between two dependent requests in the original run should be preserved in the replay. Otherwise, the replay may not produce the same output as the original run.

Considering the statements listed below, Q1 is executed before Q2 in the original run. Assume that both statements are executed in auto-commit mode (where each SQL statement is committed immediately after it is executed). During database replay, suppose that Q1 and Q2 are replayed in reverse order. The output of Q2 differs from that in the original run, which violates output determinism.

Q1: UPDATE emp SET salary=salary*1.1;

Q2: SELECT * FROM emp WHERE salary >60000;

DRSs help ensure output determinism by generating a dependency graph from a captured workload and replaying requests based on the dependency graph. Each vertex in the dependency graph corresponds to a request, and an edge imposes a precedence constraint between two requests. Although one can ensure output determinism by sequentially replaying the requests in the same order as they took place during capture time, this naive approach fails to produce a realistic replay, severely limiting concurrency. Instead, by executing the requests in parallel, while preserving the ordering in the dependency graph, DRSs can achieve output determinism while supporting realistic, concurrent replay.

DRSs often support the following four phases in their database replay workflow: workload capture, dependency graph generation, workload replay, and report generation. In the first phase, a DRS records all requests in a workload, one capture file for each session. This step is done in a production system, while the other steps are typically done in a test system to avoid interfering with running applications in the production system.

In the dependency generation phase, a DRS generates a dependency graph that imposes precedence constraints among requests to ensure the output determinism. In the workload replay phase, the DRS replays captured workloads using the minimal dependency graph with those capture files. The last step generates various reports about any divergence between system changes.

Note that the decision to migrate existing database instances to a target system typically cannot be made based on one replayed captured workload. Instead, capture-and-replay are often executed continuously to test the target system using various workloads. Thus, reducing the time needed to generate a dependency graph is important to performance of a DRS, although dependency graph generation is an offline process.

To achieve output determinism while maximizing concurrency, the DRS typically seeks to generate the minimal dependency graph with the shortest critical path (the sequence of dependent tasks that determines the minimum time required to complete the workload) and replay the workload based on it. One technique, referred to as RBSS (Repetitive Backward Scan and Shortest path), provides a dependency graph generation algorithm using a generate-and-prune strategy.

With this strategy, the generation step generates the incoming edges of each vertex by finding the latest dependent requests in other sessions using a backward scan, while the pruning step prunes redundant edges using a transitive reduction algorithm. However, available techniques for generating dependency graphs still require significant time and computing resources. Thus, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for providing improved replay of a database workload. In particular, the present disclosure provides techniques for generating dependency graphs that have a reduced number of redundant edges. In particular, the dependency graphs can be generated using a technique that removes subpaths of a larger path of requests for database operations that access a common database object. Another technique removes subpaths of a larger path the incudes additional requests in multiple sessions, even if some requests access different database objects. Particular implementations process a set of requests to generate state information, where the state information can be used in generating a dependency graph that excludes one more types of redundant edges. Additional efficiency is provided in that graphs can be generated using a single scan of a given request.

In one aspect, the present disclosure provides a process of replaying database operations using a dependency graph using state information. Information regarding a database workload is received. The workload includes a plurality of requests for one or more database operations. The information includes a timestamp of the given request, a request type for the given request, a set of one or more objects accessed by the given request, and, optionally, a session identifier that identifies a session in which the request was made.

Respective state information for given requests of the plurality of requests is generated during a forward scan of the plurality of requests from the information regarding the database workload. The state information includes either or both of two categories of information. A first category of information includes, for an object of the set of one or more objects accessed by the given request, for one or more sessions of a plurality of sessions, an identifier of a latest commit request for the object and a set of non-commit requests accessing the object of the set of one or more objects after the latest commit request for the object. In a second category, when the information regarding the database workload includes a session identifier, the information includes, for respective pairs of sessions of the plurality of sessions, for a source session and a target session of a respective pair of sessions, a latest edge between a request in the source session and a request in the target session.

A dependency graph for the plurality of requests is generated using the state information produced during the forward scan. At 1016, the system replays at least a portion of the requests for database operations in the workload. The order of replay is determined based at least in part on the dependency graph.

In another aspect, the present disclosure provides a process for replaying requests for database operations using a dependency graph that accounts for inter-session transitivity. A plurality of requests for database operations in a workload are determined. A dependency graph for the plurality of requests is generated. The generating includes removing paths between requests in different sessions represented in the workload. These paths are subpaths of longer dependency graph paths that span multiple sessions of the different sessions and include at least one intermediate request. At least a portion of the requests for database operations in the workload are replayed. The order of replay is determined at least in part from the dependency graph.

In a further aspect, the present disclosure provides a process for replaying requests for database operations using a dependency graph that accounts for object transitivity. A plurality of requests for database operations in a workload are determined. A dependency graph for the plurality of requests for database operations is generated. The generating includes removing from the dependency graph paths between requests that access a common object. These removed paths are subpaths of a longer dependency graph path between requests that access the common object and include at least one intermediate request. At least a portion of the requests for database operations in the workload are replayed. The order of replay is determined at least in part from the dependency graph.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 2) is a diagram depicting a database environment providing for processing of requests for database operations.

FIG. 10A is a flowchart of a process of replaying database operations using a dependency graph using state information.

FIG. 10B is a flowchart of a process for replaying requests for database operations using a dependency graph that accounts for inter-session transitivity.

FIG. 10C is a flowchart of a process for replaying requests for database operations using a dependency graph that accounts for object transitivity.

DETAILED DESCRIPTION

Example 5)—Overview

Figure 1:
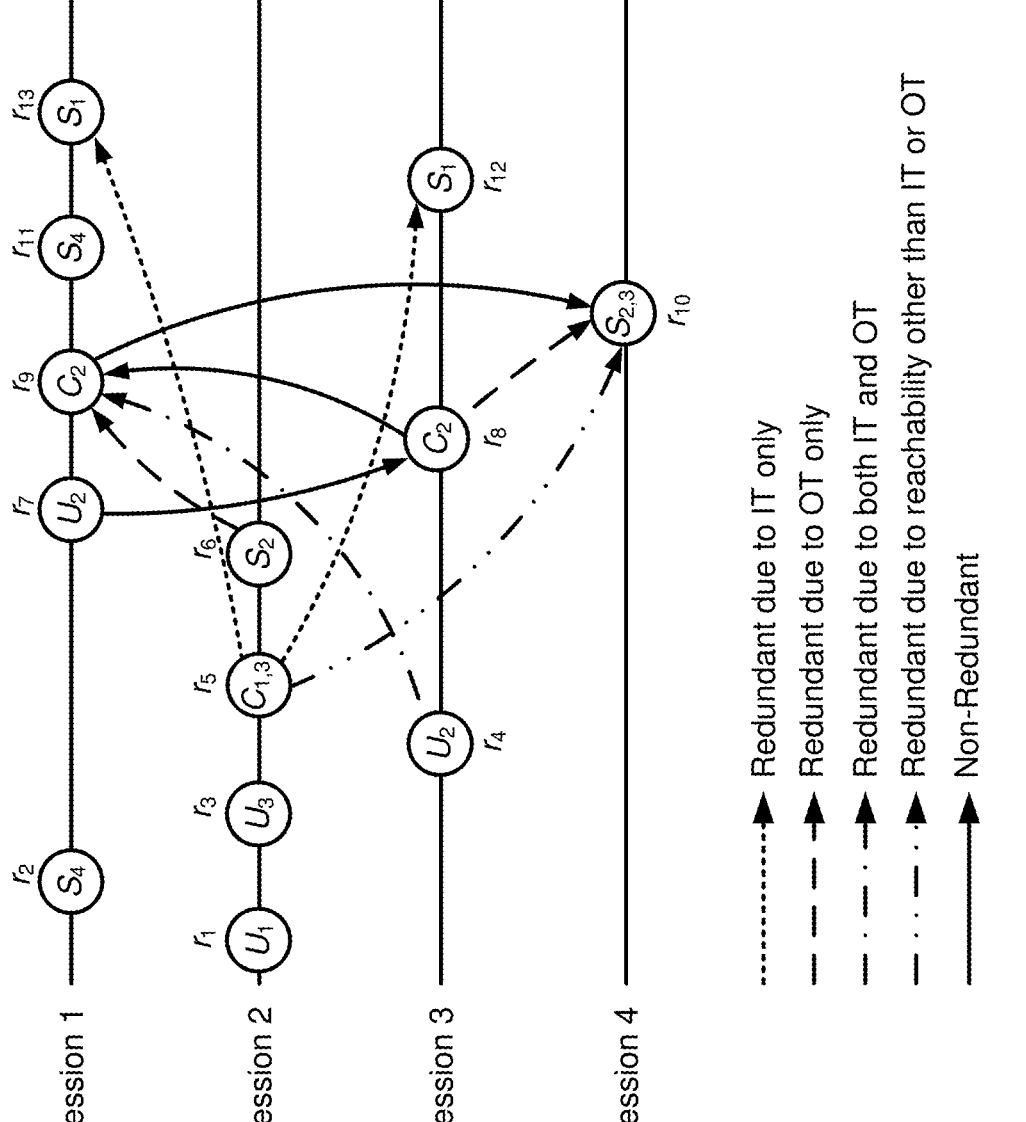
FIG. 1) is an example dependency graph of relationships between requests for database operations in a workload, showing edge types, including whether an edge is redundant to another edge.

Database replay systems (DRSs) test relational database systems in a test system. DRSs capture workloads on a production system and then replay them in the test system to test various system changes (such as hardware/software upgrades) and to avoid risks such as (a) performance regression, (b) bugs, or (c) new resource contention points before releasing them in production. In typical implementations, a workload includes user requests, each containing a SQL statement associated with session ID.

Output determinism helps ensure that the replay of a captured workload produces the same output as the original run, even when physical plans for the workload change due to hardware or software updates. The relative ordering between two dependent requests in the original run should be preserved in the replay. Otherwise, the replay may not produce the same output as the original run.

Considering the statements listed below, Q1 is executed before Q2 in the original run. Assume that both statements are executed in auto-commit mode (where each SQL statement is committed immediately after it is executed). During database replay, suppose that Q1 and Q2 are replayed in reverse order. The output of Q2 differs from that in the original run, which violates output determinism.

Q1: UPDATE emp SET salary=salary*1.1;
Q2: SELECT * FROM emp WHERE salary >60000;

DRSs help ensure output determinism by generating a dependency graph from a captured workload and replaying requests based on the dependency graph. Each vertex in the dependency graph corresponds to a request, and an edge imposes a precedence constraint between two requests. Although one can ensure output determinism by sequentially replaying the requests in the same order as they took place during capture time, this naive approach fails to produce a realistic replay, severely limiting concurrency. Instead, by executing the requests in parallel, while preserving the ordering in the dependency graph, DRSs can achieve output determinism while supporting realistic, concurrent replay.

DRSs often support the following four phases in their database replay workflow: workload capture, dependency graph generation, workload replay, and report generation. In the first phase, a DRS records all requests in a workload, one capture file for each session. This step is done in a production system, while the other steps are typically done in a test system to avoid interfering with running applications in the production system.

In the dependency generation phase, a DRS generates a dependency graph that imposes precedence constraints among requests to ensure the output determinism. In the workload replay phase, the DRS replays captured workloads using the minimal dependency graph with those capture files. The last step generates various reports about any divergence between system changes.

Note that the decision to migrate existing database instances to a target system typically cannot be made based on one replayed captured workload. Instead, capture-and-replay are often executed continuously to test the target system using various workloads. Thus, reducing the time needed to generate a dependency graph is important to performance of a DRS, although dependency graph generation is an offline process.

To achieve output determinism while maximizing concurrency, the DRS typically seeks to generate the minimal dependency graph with the shortest critical path (the sequence of dependent tasks that determines the minimum time required to complete the workload) and replay the workload based on it. One technique, referred to as RBSS (Repetitive Backward Scan and Shortest path), provides a dependency graph generation algorithm using a generate-and-prune strategy.

With this strategy, the generation step generates the incoming edges of each vertex by finding the latest dependent requests in other sessions using a backward scan, while the pruning step prunes redundant edges using a transitive reduction algorithm. However, available techniques for generating dependency graphs still require significant time and computing resources. Thus, room for improvement exists.

In a dependency graph, a direct edge (u, v) is redundant if v is reachable from u after removing the edge. Techniques such as RBSS can still generate a large dependency graph containing many redundant edges, although they can be filtered in the generation step. For example, the Table 1 below shows that 99.6% of the edges in this dependency graph (labeled as $\mathcal{G}_{RBSS}$) are redundant in a representative ERP workload, SD-Benchmark. Given a dependency graph G (V, E), computing its transitive reduction G$^{tr}$(V, E') can be expensive when |E|>>|E'|, since all redundant edges in E will be removed.

| | $\frac{\text{\# of redundant edges}}{\text{\# of edges}} \times 100\%$ |
|---|---|
| $\mathcal{G}_{RBSS}$ | 99.6% |
| IT-free graph ($\mathcal{G}_{IT}$) | 73.7% |
| OT-free graph ($\mathcal{G}_{OT}$) | 62.9% |
| IT[OT]-free graph ($\mathcal{G}_{IT[OT]}$) | 9.0% |
| OTIT-free graph ($\mathcal{G}_{OTIT}$) | 5.3% |

In addition, the time complexity of RBSS can be $O(|V|^2)$, due to repetitive backward scans for every vertex. Specifically, to generate in-edges of each vertex in a session, RBSS scans other sessions backward until reaching the start of the sessions in the worst case. Furthermore, backward scanning accesses many unnecessary sessions. This inefficiency in the dependency graph generation algorithm significantly increases the dependency graph generation time. The present disclosure provides improved techniques to generate a dependency graph close to the transitive reduction's size.

RBSS incurs a major bottleneck in the capture-and-replay pipeline, constituting more than 50% of the total end-to-end time.

To address this problem, two types of dominant, redundant edges in the dependency graph are defined: object transitivity (OT) and inter-session transitivity (IT). OT refers to redundancy due to a path where all requests on the path access a common object. Consider a dependency graph in FIG. 1. The label of a vertex represents an operation (Update, Select, or Commit) on an object. The label (i.e., $U_1$) of a request $r^1$ represents an update statement on object 1. The path ($r_6$, $r_9$) is redundant by OT, since there is a path ($r_6$, $r_8$, $r_9$) where all requests access the common object 2.

IT refers to redundancy due to a path through requests in two sessions, even if some of the requests access different object(s). Consider Sessions 2 and 3. The edge ($r_5$, $r_{12}$) is redundant due to IT, as a path ($r_5$, $r_6$, $r_8$, $r_{12}$) through these sessions exists. Note that $r_5$ and $r_{12}$ access object 1, while the other requests access object 2.

Four new dependency graphs are provided: IT(k)-free, OT-free, OTIT-free, and IT[OT]-free graphs. The OT-free graph captures the transitive property of edges through common objects. An IT[OT]-free graph takes advantages from both. These graphs can reduce the number of redundant edges, as summarized in Table 1, above (showing the proportion of the redundant edges in each dependency graph in SD-benchmark with 16 server instances).

In order to avoid repetitive backward scans, the present disclosure provides a computationally efficient dependency graph generation algorithm called stateful single forward scan (SSFS). SSFS performs a single forward scan over all requests while maintaining states. By analyzing the definitions of redundancies, the states depending on the dependency graph type are limited. A parallel version of SSFS is also described, where the requests are horizontally partitioned by time range. The parallel SSFS hierarchically merges these local dependency graphs to generate a global dependency graph, improving performance.

Example 6)—Overview of Database Workload Capture and Replay

Migrating a database system to a new program version, or seeking to optimize database operational parameters, can be problematic. For example, for a production (currently in operational use) database system, parameter or software version changes may negatively affect the usability, stability, or speed of the database system. Users may seek to create a test database system in order to evaluate the performance impact of using a new program version, or changing the parameters of a new or existing program version, in order to avoid negative impacts on a production database system.

In at least some embodiments, a workload refers to an amount of work, such as work involving data transfer or processing at a database system, over time. The workload can include requests for database operations received by the database system from database clients. The workload can also include internal database operations, such as transferring or copying information in memory to persistent storage, the generation of temporary tables or other data (including data or metadata associated with a request for a database operation), and incorporating of temporary or other data into primary data sources.

FIG. 2 illustrates a database environment 200 having a first, source database environment 210 that includes one or more clients 215, one or more applications servers 220 available to service requests for database operations from the clients, and a first database system 225 on which the database operations are carried out. The database environment 200 also includes a second, test database environment 230 having an emulated workload 235, such as a workload that seeks to replicate a workload produced by the clients 215 of the first database environment 210. The second database environment 230 includes application servers 240 to service requests for database operations from the emulated workload 235. The database operations are carried out on a second database system 245, such as a database system 245 having different operational parameters or a different software version than the first database system 225.

Testing the performance of the second database system 245 under a workload at least similar to that experienced by the first database system 225 can be problematic. Typically, a test database system is evaluated using an artificially generated workload, such as the emulated workload 235. However, these artificial workloads may not accurately reflect the actual workloads experienced by the first, production database system 225. Thus, predicted negative or positive performance impacts observed on the second database system 245 may not accurately reflect performance under a workload experienced by the first database system 225.

Capturing a workload from the first database environment 210 to run at the second database environment 230 can also be problematic. For example, it may be difficult to capture all the inputs necessary to replicate the workload generated by the clients 215. In addition, the capture process itself may negatively impact the performance of the first database system 225, such as by increasing the processing load on a computing system operating the database system, or delaying processing of operations on the first database system 205.

Figure 3:
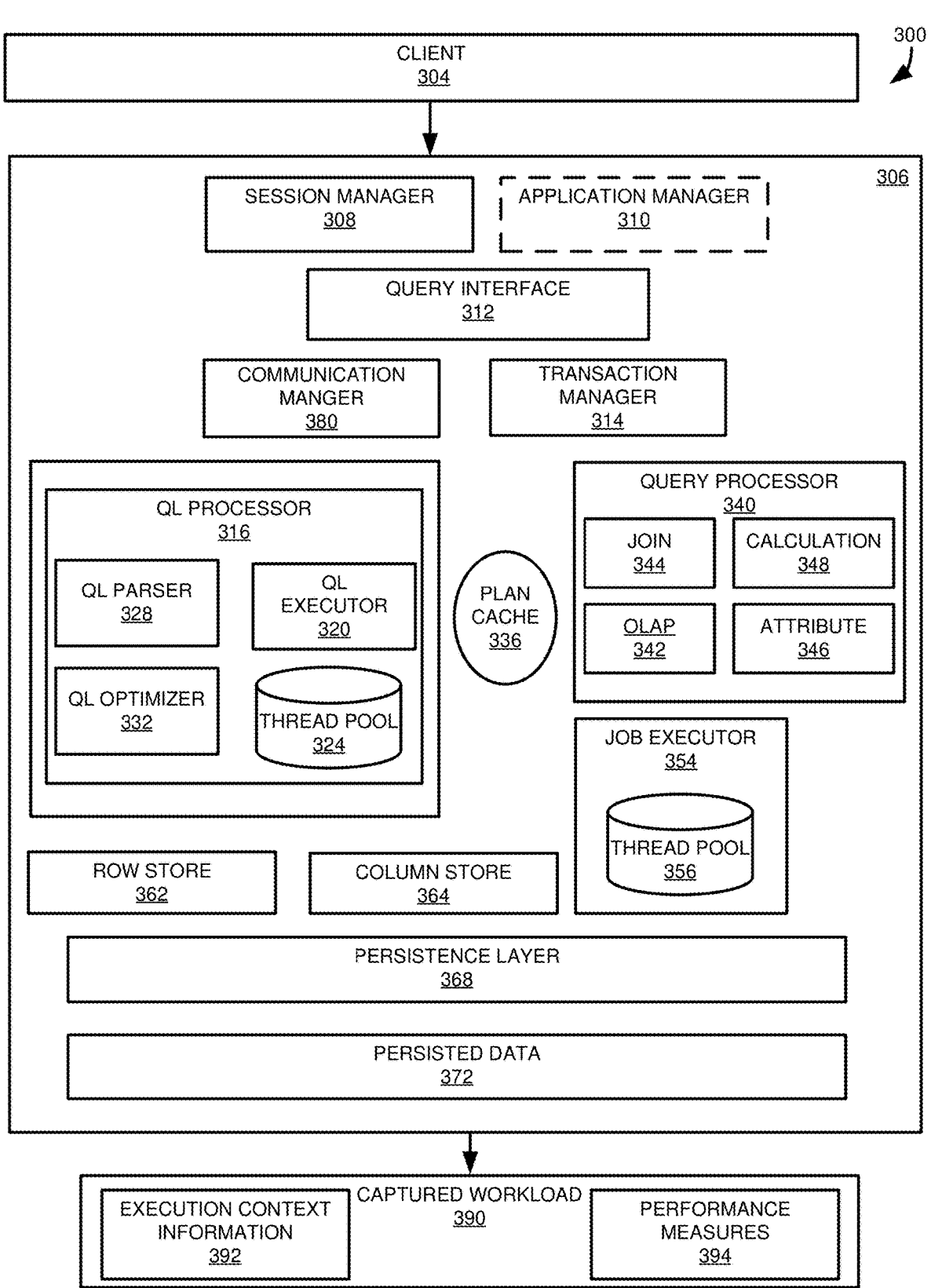
FIG. 3) is a diagram illustrating database environments for capturing a database workload at a first database system and replaying the workload at a second database system.

FIG. 3 illustrates an example database environment 300. The database environment 300 can include a client 304. Although a single client 304 is shown, the client 304 can represent multiple clients. The client or clients 304 may be OLAP clients, OLTP clients, or a combination thereof.

The client 304 is in communication with a database server 306. Through various subcomponents, the database server 306 can process requests for database operations, such as requests to store, read, or manipulate data. A session manager component 308 can be responsible for managing connections between the client 304 and the database server 306, such as clients communicating with the database server using a database programming interface, such as Java Database Connectivity (JDBC), Open Database Connectivity (ODBC), or Database Shared Library (DBSL). Typically, the session manager 308 can simultaneously manage connections with multiple clients 304.

The session manager 308 can carry out functions such as creating a new session for a client request, assigning a client request to an existing session, and authenticating access to the database server 306. For each session, the session manager 308 can maintain a context that stores a set of parameters related to the session, such as settings related to committing database transactions or the transaction isolation level (such as statement level isolation or transaction level isolation).

For other types of clients 304, such as web-based clients (such as a client using the HTTP protocol or a similar transport protocol), the client can interface with an application manager component 310. Although shown as a component of the database server 306, in other implementations, the application manager 310 can be located outside of, but in communication with, the database server 306. The application manager 310 can initiate new database sessions with the database server 306, and carry out other functions, in a similar manner to the session manager 308.

The application manager 310 can determine the type of application making a request for a database operation and mediate execution of the request at the database server 306, such as by invoking or executing procedure calls, generating query language statements from a request that can be executed by the database server, or converting data between formats useable by the client 304 and the database server 306. In particular examples, the application manager 310 receives requests for database operations from a client 304, but does not store information, such as state information, related to the requests.

Once a connection is established between the client 304 and the database server 306, including when established through the application manager 310, execution of client requests is usually carried out using a query language, such as the structured query language (SQL). In executing the request, the session manager 308 and application manager 310 may communicate with a query interface 312. The query interface 312 can be responsible for creating connections with appropriate execution components of the database server 306. The query interface 312 can also be responsible for determining whether a request is associated with a previously cached statement or a stored procedure for the request, and calling the stored procedure or associating the previously cached statement with the request.

At least certain types of requests for database operations, such as statements in a query language to write data or manipulate data, can be associated with a transaction context. In at least some implementations, each new session can be assigned to a transaction. Transactions can be managed by a transaction manager component 314. The transaction manager component 314 can be responsible for operations such as coordinating transactions, managing transaction isolation, tracking running and closed transactions, and managing the commit or rollback of transactions. In carrying out these operations, the transaction manager 314 can communicate with other components of the database server 306.

The query interface 312 can communicate with a query language processor 316, such as a structured query language processor. For example, the query interface 312 may forward to the query language processor 316 query language statements or other database operation requests from the client 304. The query language processor 316 can include a query language executor 320, such as a SQL executor, which can include a thread pool 324.

Some requests for database operations, or components thereof, can be executed directly by the query language processor 316. Other requests, or components thereof, can be forwarded by the query language processor 316 to another component of the database server 306. For example, transaction control statements (such as commit or rollback operations) can be forwarded by the query language processor 316 to the transaction manager 314.

In at least some cases, the query language processor 316 is responsible for carrying out operations that manipulate data (e.g., SELECT, UPDATE, DELETE). Other types of operations, such as queries, can be sent by the query language processor 316 to other components of the database server 306. The query interface 312, and the session manager 308, can maintain and manage context information associated with requests for database operation. In particular implementations, the query interface 312 can maintain and manage context information for requests received through the application manager 310.

When a connection is established between the client 304 and the database server 306 by the session manager 308 or the application manager 310, a client request, such as a query, can be assigned to a thread of the thread pool 324, such as using the query interface 312. In at least one implementation, a thread is a context for executing a processing activity. The thread can be managed by an operating system of the database server 306, or by, or in combination with, another component of the database server. Typically, at any point, the thread pool 324 contains a plurality of threads. In at least some cases, the number of threads in the thread pool 324 can be dynamically adjusted, such in response to a level of activity at the database server 306. Each thread of the thread pool 324, in particular aspects, can be assigned to a plurality of different sessions.

When a query is received, the session manager 308 or the application manager 310 can determine whether an execution plan for the query already exists, such as in a plan cache 336. If a query execution plan exists, the cached execution plan can be retrieved and forwarded to the query language executor 320, such as using the query interface 312. For example, the query can be sent to an execution thread of the thread pool 324 determined by the session manager 308 or the application manager 310. In a particular example, the query plan is implemented as an abstract data type.

If the query is not associated with an existing execution plan, the query can be parsed using a query language parser 328. The query language parser 328 can, for example, check query language statements of the query to make sure they have correct syntax, and confirm that the statements are otherwise valid. For example, the query language parser 328 can check to see if tables and records recited in the query language statements are defined in the database server 306.

The query can also be optimized using a query language optimizer 332. The query language optimizer 332 can manipulate elements of the query language statement to allow the query to be processed more efficiently. For example, the query language optimizer 332 may perform operations such as unnesting queries or determining an optimized execution order for various operations in the query, such as operations within a statement. After optimization, an execution plan can be generated for the query. In at least some cases, the execution plan can be cached, such as in the plan cache 336, which can be retrieved (such as by the session manager 308 or the application manager 310) if the query is received again.

Once a query execution plan has been generated or received, the query language executor 320 can oversee the execution of an execution plan for the query. For example, the query language executor 320 can invoke appropriate subcomponents of the database server 306.

In executing the query, the query language executor 320 can call a query processor 340, which can include one or more query processing engines. The query processing engines can include, for example, an OLAP engine 342, a join engine 344, an attribute engine 346, or a calculation engine 348. The OLAP engine 342 can, for example, apply rules to create an optimized execution plan for an OLAP query. The join engine 344 can be used to implement relational operators, typically for non-OLAP queries, such as join and aggregation operations. In a particular implementation, the attribute engine 346 can implement column data structures and access operations. For example, the attribute engine 346 can implement merge functions and query processing functions, such as scanning columns.

In certain situations, such as if the query involves complex or internally parallelized operations or sub-operations, the query executor 320 can send operations or sub-operations of the query to a job executor component 354, which can include a thread pool 356. An execution plan for the query can include a plurality of plan operators. Each job execution thread of the job execution thread pool 356, in a particular implementation, can be assigned to an individual plan operator. The job executor component 354 can be used to execute at least a portion of the operators of the query in parallel. In some cases, plan operators can be further divided and parallelized, such as having operations concurrently access different parts of the same table. Using the job executor component 354 can increase the load on one or more processing units of the database server 306, but can improve execution time of the query.

The query processing engines of the query processor 340 can access data stored in the database server 306. Data can be stored in a row-wise format in a row store 362, or in a column-wise format in a column store 364. In at least some cases, data can be transformed between a row-wise format and a column-wise format. A particular operation carried out by the query processor 340 may access or manipulate data in the row store 362, the column store 364, or, at least for certain types of operations (such a join, merge, and sub-query), both the row store 362 and the column store 364.

A persistence layer 368 can be in communication with the row store 362 and the column store 364. The persistence layer 368 can be responsible for actions such as committing write transaction, storing redo log entries, rolling back transactions, and periodically writing data to storage to provided persisted data 372.

In executing a request for a database operation, such as a query or a transaction, the database server 306 may need to access information stored at another location, such as another database server. The database server 306 may include a communication manager 380 component to manage such communications. The communication manger 380 can also mediate communications between the database server 306 and the client 304 or the application manager 310, when the application manager is located outside of the database server.

In some cases, the database server 306 can be part of a distributed database system that includes multiple database servers. At least a portion of the database servers may include some or all of the components of the database server 306. The database servers of the database system can, in some cases, store multiple copies of data. For example, a table may be replicated at more than one database server. In addition, or alternatively, information in the database system can be distributed between multiple servers. For example, a first database server may hold a copy of a first table and a second database server can hold a copy of a second table. In yet further implementations, information can be partitioned between database servers. For example, a first database server may hold a first portion of a first table and a second database server may hold a second portion of the first table.

In carrying out requests for database operations, the database server 306 may need to access other database servers, or other information sources, within the database system. The communication manager 380 can be used to mediate such communications. For example, the communication manager 380 can receive and route requests for information from components of the database server 306 (or from another database server) and receive and route replies.

One or more components of the database system 300, including components of the database server 306, can be used to produce a captured workload 390 that includes execution context information 392 and one or more performance measures 394. The captured workload 390 can be replayed, such as after being processed, at another database system.

Example 7)—Workload Capture Mechanism and Structure

Figure 4:
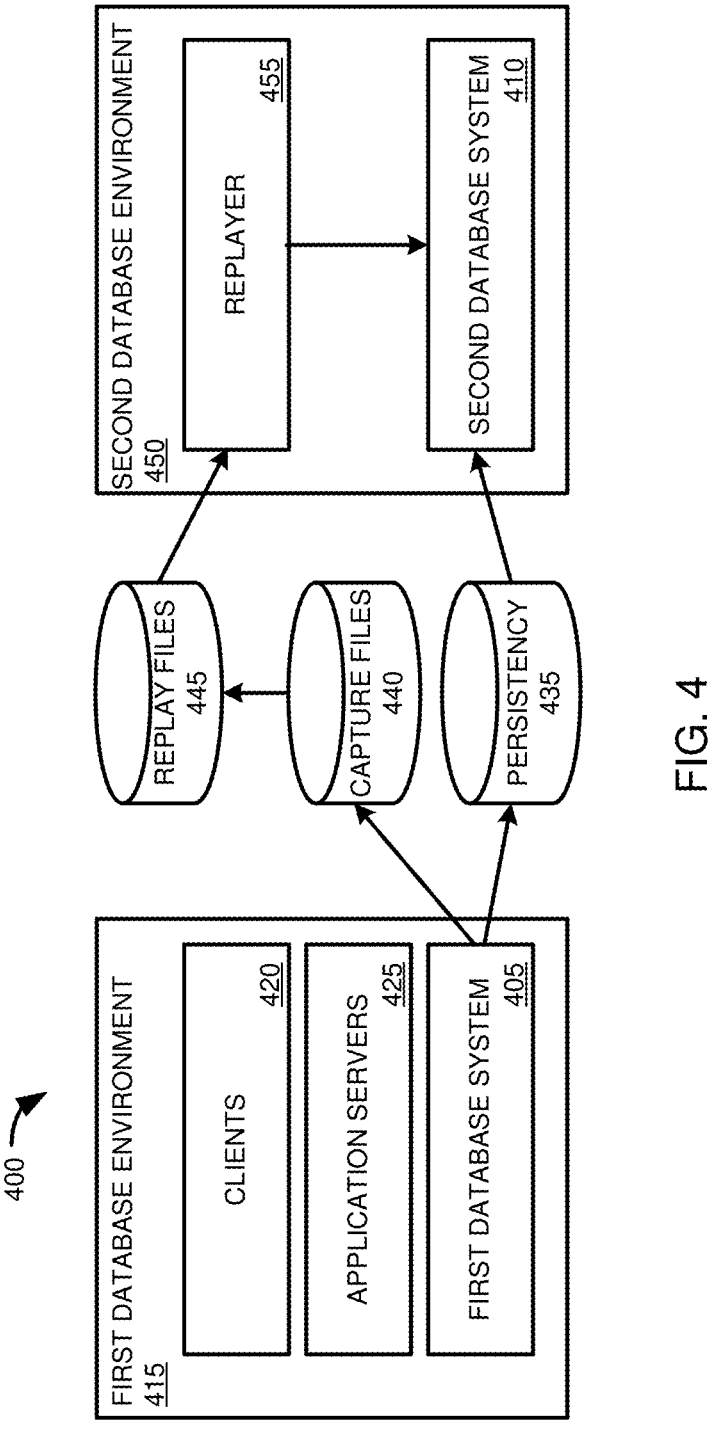
FIG. 4) is a diagram depicting a first database environment having a first database system and a second database environment having a second database system executing a captured workload of the first database system.

FIG. 4 provides a diagram of a database environment 400 for implementing a method according to this Example 3 for improving the performance comparison of a first database system 405 with a second database system 410. In some cases, the first database system 405 and the second database system 410 use different versions of the same computer program. In other cases, the first database system 405 and the second database system 410 use the same version of the same computer program, but with different settings. In yet further cases, the first database system 405 and the second database system 410 may use different computer programs for implementing a database system The first database system 405 is part of a first database environment 415. The first database environment 415 can include one or more clients 420 issuing requests for database operations to one or more application servers 425. The one or more application servers 425 can send the requests for database operations to be carried out by the first database system 405.

In carrying out the requests, the first database system 405 can store information regarding the operations in a persistency layer 435. The persistency layer 435 can include, for example, data stored in a persistent, non-transitory computer-readable storage medium. In addition, the first database system 405 can generate information about the requests, which can be stored, such as in one or more capture files 440. The capture files 440 can include information regarding the request (including the request), data, including metadata, generated during execution of the request, the results of the request, and information about the first database environment 415, the clients 420, or the first database system 405. In at least some cases, the capture files 440 can be stored in a compressed format.

In some cases, each capture file 440, or a particular collection of files includes data associated with, and organized by, a capture unit. The capture unit can be, for example, a session between a client 420 and the first database system 405 mediated by an application server 425. The session may include one or more requests for database operations, such as one or more statements in a query processing language, such as a query or a transaction. In other cases, the capture file 440, or particular collection of files, represents another processing unit, such as a statement, or a collection of statements over a time period.

The capture files 440 can be processed, such as by the first database system 405, the second database system 410, or another computing system, to produce data, such as replay files 445, suitable for being replayed at a second database environment 450, which includes the second database system 410. The replay files 445 can, for example, decompress information in the capture files 440, or otherwise manipulate the data of the capture files 440 into a form more easily executed at the second database environment 450. In addition to information used for replaying requests for database operations, the capture files 440 can include information that is used to evaluate the performance of the second database system 410 using the captured workload, instead of, or in addition to, being used for replay purposes.

The second database environment 450 can including a replayer component 455. The replayer component 455 may use the replay files 445 to send requests for database operations to the second database system 410 that emulate the requests issued by the clients 420 to the first database system 415.

The system of FIG. 4 can provide a number of advantages. For example, in at least some cases, the capture files 440 can be generated using components of the first database system 405. For example, information in the capture files 440 can include information generated by components of the first database system 405 in carrying out a request for a database operation. The use of existing components, operations, and generated data can reduce the processing load on the first database system 405 in saving a workload, or elements thereof, to be replayed at the second database system 410. In at least some cases, the capture files 440 can include less than all of the information generated during execution of the requests for database operations at the first database system 405, which can also reduce the amount of memory or storage needed to reproduce the workload at the second database system 410. In addition, the conversion of capture files 440 to replay files 445 can be carried out asynchronously and at a different computing system than the first database system 405.

Information included in the capture files 440 can come from one or more sources. In some implementations, capture files 440 can be organized by, or otherwise include data for, capture units, such as database sessions, or another set or subset of requests for database operations. A capture unit, its operations, and data and metadata created during execution of requests for database operations contained in the capture unit (including data returned in response to a query language statement, such as query results), can be associated with a context. In at least some aspects, a context, such as an execution context, is information that describes, or provides details regarding, a particular capture unit, which can be represented by a fact. As described below, the capture unit can be associated with additional facts, such as performance measures.

For example, the session itself may be associated with a session content. The session context can include information such as:

how statements or transactions are committed, such as whether statements are automatically committed after being executed transaction isolation level, such as read committed or repeatable read client geographical location syntax used in the session, such whether strings are null terminated how deferred writing of large objects is carried out a connection identifier a user identifier/user schema an application identifier verbosity settings for logging task execution identifiers debugger information As previously mentioned, elements of a session, such as a transaction, can also be associated with a context. A transaction context can include information such as:

snapshot timestamp (such as used for multi-version con-
currency control)

statement sequence number commit ID updates to a transaction identifier

Similarly, when the statement is a query, such as a query
having a query execution plan, a plan context can include
information such as:

query ID/query string query plan compilation time statement hash memory statistics associated with the statement or plan Applications interacting with the database system may be
associated with a context, an application context can include
information such as:

application name application user name application source code identifier a client identifier location information variable mode (such as whether strings are null termi-
nated)

Along with these various contexts, various values, such as
facts or performance measures, associated with a workload
capture unit, or an element thereof, may be of interest, and
stored in the capture files 440. For example, facts or mea-
sures may include:

an identifier, such as a timestamp, associated with the
capture unit elapsed time (such as session duration)

processor usage memory usage number of executions carried out number of network calls number of input/output operations any waits encountered while the session was active In some cases, the capture files 440, such as one or more
of the contexts and the measure, can include non-determin-
istic values, such as non-deterministic values associated
with a query language statement or its associated operations.
Nondeterministic values refer to values that may be different
between different computing devices (e.g., different between
a database system (or server thereof) where a workload is
captured and a database system (or a server thereof) where
the workload is replayed. For example, a timestamp function
will return a current timestamp value when run on the first
database system 405, which may be a different timestamp
value than when run at a later time on the second database
system 410. Other examples of non-deterministic values
include updated database sequence values, generation of
random numbers, connection identifiers, and identifiers
related to updated transactions.

In particular examples, it can be beneficial to use the same
nondeterministic value as used during execution of a request
for a database operation at the first database system 405
when the request is carried out at the second database system
410. In implementations where the same value is to be used,
the nondeterministic function can be evaluated once (e.g., on
the first database system 405) and the resulting value can be
provided in the capture files 440 so that when the request (or
other workload element) is executed on the second database
system 410, the same value will be used (the same value that
was used at the workload capture database system).

Although workload capture has been described as occur-
ring with external clients 420, in at least some embodiments,
workload capture may also include capture of internal database operations for inclusion in the workload capture
files 440. The captured internal operations can be replayed
at the second database environment 450. For example, the
replay of the captured internal operations at the second
database environment 450 may affect the performance of the
second database system 410, including the performance of
replayed workload elements originating at the clients 420. In
other examples, the captured internal operations are not
replayed at the replica database system 410, but are used to
compare the performance of the first database system 405
with the performance of the second database system 410.
For example, the performance comparison can include com-
paring a number of internal operations generated by the
workload at the first database system 405 with a number of
internal operations generated by the second database system
410.

In some cases, the internal operations may be triggered by
a user. In other cases, the internal operations occur auto-
matically during operation of the database system. For
example, with reference to FIG. 3, periodically, the state
(such as changed records and redo logs) of the database
server 306 can be written as persisted data 372 by the
persistence layer 368, such as to create a save point. Save
points, in some examples, may be requested by a user. In
other examples, save points may occur automatically, such
as according to a schedule, when a threshold number of
records have been changed, or when a threshold number of
request for database operations have been received or
executed. Similarly, storage snapshots, file system backups,
data backups, and log backup operations can be captured
and, optionally, replayed.

Changes to database records, such as records in the
column store 364, can, in some examples, be written to
temporary copies of the database records. Periodically, the
changes reflected in the temporary copies can be merged into
the source database records. Making changes to temporary
copies can improve the performance of write operations,
including concurrent write operations. The temporary copies
can, for example, be maintained in an uncompressed state,
or state with reduced compression, compared with the
primary database records. Merge operations can be captured
and included in the capture files 440.

Internal operations can also include housekeeping opera-
tions. For example, in some cases, the first database system
405 can have recent or often-used data in-memory, and
older, or less commonly used, data can be stored in persis-
tent storage, such as persistent storage 435 or another
persistent storage. The capture files 440 can store informa-
tion regarding the transfer of data between persistent storage
and memory.

The capture files 440 may include all or a portion of these
contexts, context elements or values, facts, and measures. In
addition, the capture files 440 can include additional infor-
mation, such as information that may be of assistance in
replaying the workload at the second database system 410 or
in evaluating the performance of the execution of the
workload at the first database system 405, such as nonde-
terministic values.

In at least some implementations, the volume of infor-
mation that can be collected for a workload can be large. In
at least some cases, the volume of information can be
reduced by only including a portion of the information, such
as a portion of the context information, in the capture files
440. In addition, to assist with organization and compression
of the information, in some implementations, the informa-
tion can be organized in a schema or a dimensional model,
such as a star schema. For example, the measures and facts can be used as the central fact table or tables, which reference as points one or more dimensions, each dimension including one or more contexts. In a particular implementation, each point represents a discrete context, and, in addition to any facts or measures, the fact table includes identifiers for corresponding information in the dimensions.

Example 8)—Overview of Dependency Graphs

Capture and replay systems using disclosed techniques provide a multi-purpose testing tool that allows users to capture the workload running on a source system and replay the captured workload on a target system with detailed replay analysis reports. Users can easily manage the entire process through a visualization tool.

A capturing step automatically captures the workload information including execution context information and requests running on the production system in a lightweight way. Captured information, such as SQL data and transaction data, is categorized and stored in different files according to its type. In this step, the DRS backs up the current snapshot so that it can be used for replay.

A preprocessing step in a control system receives captured workload files as input and generates dependency graph files for consistent workload replay. The input files contain information about requests issued from each database session at the time of capturing. The resulting files can be replayed multiple times. The generated dependency graph file is a serialization of requests, where each request is associated with dependent requests in other concurrent sessions. Note that the dependency graph generation can consume 50% of the total end-to-end time for existing DRSs.

The replaying step replays the captured workload using dependency graph files while preserving transactional order on the target system. Specifically, loader threads read the dependency graph files and load them into session-specific request queues. Each queue is managed by a request dispatcher that controls the execution timing. The request dispatcher then sends the requests from the queue to execution threads. The requests without incoming edges can be executed. When a non-commit request starts, it obtains a snapshot (captures the current state of the database at that specific moment, defined by an identifier that represents the state of the database at the beginning of execution, often the current commit timestamp) and removes its outgoing edges (deletes the dependencies that it imposes on subsequent requests). This enables successful completion of long-read transactions without blocking write transactions. A commit request, on the other hand, acquires a commit timestamp and removes the outgoing edges, allowing successful commitment. After running the requests, the execution threads return their results.

The analyzing step compares replayed results with captured results and generates visualized analysis reports. The comparison can include information regarding performance and consistency. For performance comparison, system-level throughput, resource consumption, and the execution times of individual requests are measured. The overall database state and the execution result of individual requests are checked for consistency.

Example 9)—Overview of Techniques for Removing Redundant Edges to Provide Optimized Dependency Graphs The present disclosure provides a formal taxonomy using the design space of all combinations of intersession transitivity (IT) and object transitivity (OT): IT(k)-free, OT-free, OTIT-free, and IT[OT]-free graphs. Since the dependency graph generated from the workload is ultimately pruned by extensive transitive reduction, it is desirable to find a compact dependency graph that can be efficiently generated by a sequential scan. Based on this formal taxonomy, it is shown in Lemma 1, discussed as the specification proceeds, that the dependency graph generated by RBSS is a special case of IT(1)-free graph, since it fails to prune edges $(r, r')$ with more than one IT connectivity between r and r'.

A workload $\mathcal{W}$ is modeled as a directed graph $\mathcal{G}_{ini} = (\mathcal{V}_R, \varepsilon_{ses})$, where each vertex $(\mathcal{V})$ corresponds to a request in $\mathcal{W}$, and each edge $(\varepsilon)$ is a pair of consecutive requests in a session (e.g., $(r_2, r_7)$ in FIG. 1. $\mathcal{G}_{ini}$ is called an initial graph. Here, each request r is associated with a unique timestamp (r.ts), a session ID (r.sid), and a set of objects accessed by r (r.objs). If r is a commit request, r.objs denotes the set of all objects modified by the committed transaction. For example, in FIG. 1, $r_5$.objs is $\{1, 3\}$, since the transaction T modifies objects 1 and 3 in $r_1$ and $r_3$, respectively. S denotes a set of all sessions, while O denotes a set of all objects in the workload.

In particular implementations, an object can be a table or a table partition. Requests are classified into non-commit (NC) (i.e., SELECT or UPDATE) and commit (C) requests, making their updates permanent. If a transaction does not update any object (for example, it only contains read operations), its commit request has no dependencies to requests in the other sessions. Thus, it can be ignored during the dependency graph generation phase, and simply replayed at the end of the transaction during the replay phase. Requests within a session are constrained to be replayed in order of timestamp, as imposed in $\varepsilon_{ses}$ (the set of edges for a session). Since requests in a session are stored in a timestamp order, $\varepsilon_{ses}$ does not need to be stored explicitly.

For ease of explanation, it is assumed that there exists $r_0$ and $r_\infty$, which correspond to the virtual initial and virtual last requests (these are placeholder requests that mark the start and end of the session but do not correspond to actual operations). Note that $\mathcal{G}_{ini} = (\mathcal{V}_R, \varepsilon_{ses})$ is not the dependency graph, since it contains the ordering constraints within each session only. Table 2, below, provides a notation used in the present disclosure.

| Notation | Description |
|---|---|
| $\mathcal{W}$ | a workload |
| $\mathcal{V}_R$ | a set of requests in W |
| r | a request |
| r.ts | the timestamp of r |
| r.objs | a set of objects accessed by r |
| r.sid | the session ID of r |
| S | the set of sessions in W |
| O | the set of accessed objects in W |
| $\mathcal{G}^{tr}$ | transitive reduction of a graph G |
| $\mathcal{G}^{tc}$ | transitive closure of a graph G |
| $\mathcal{G}[P]$ | the induced subgraph of $\mathcal{G} = (\mathcal{V}_R, \varepsilon)$ for a subset of vertices $P \subset \mathcal{V}_R$ |
| $\mathcal{V}(\mathcal{G})$ | the set of vertices of $\mathcal{G}$ |
| $E(\mathcal{G})$ | the set of edges of $\mathcal{G}$ |

Predicates are defined to define other dependency (binary) relations. Consider two requests r, $r' \in \mathcal{V}_R$. The predicate precedes (r, r') returns true if r.ts<r'.ts or false otherwise. A set of precedence-dependent edges is defined, $$\varepsilon_{pre} = \{(r, r') \in \mathcal{V}_{\mathcal{R}}^2 |\ \text{precedes}\ (r, r')\}.$$

A commit (r) operation returns true if r is a commit request or false otherwise. A set of commit-dependent edges is defined as $\varepsilon_{com}=\{(r, r')\in\varepsilon_{pre}|\ \text{commit}(r) \lor \text{commit}(r')\}$. A function access_common_obj (r, r') returns true if r and r' access a common object $$\left(\text{i.e.,}\ r \cdot objs \cap \frac{r}{obj} \neq \emptyset\right)$$

or false otherwise. A set of object-dependent edges is defined as $\varepsilon_{obj}=\{(r, r')\in\varepsilon_{pre}|\ \text{acess\_common\_obj}(r, r')\}$. Finally, a set of collision-dependent edges is defined as $\varepsilon_{col}=\varepsilon_{com}\cap\varepsilon_{obj}$. When (r, r')$\in\varepsilon_{col}$, r is referred to as collision-dependent to r'. The terms "dependency relation" and "edge set" are used interchangeably. Given an initial graph $\mathcal{G}_{ini}=(\mathcal{V}_R, \varepsilon_{ses})$, a dependency graph generation algorithm generates a new edge set according to its specific relation (the criteria defined by the predicates and functions, such as precedence, commit dependency, object dependency, or collision dependency). For example, a dependency graph algorithm can generate a dependency graph $\mathcal{G}_{col}=(\mathcal{V}_R, \varepsilon_{col})$ by checking both the commit dependency and the object dependency.

One extreme dependency graph is a totally ordered dependency graph $\mathcal{G}_{total}$, constructed by connecting requests in increasing timestamp order. Using $\mathcal{G}_{total}$, the requests in $\mathcal{V}_R$ are executed serially, leading to very limited concurrency, since the critical path of $\mathcal{G}_{total}$ is the longest among those of all possible dependency graphs. The other extreme graph is a minimal dependency graph $\mathcal{G}_{min}=(\mathcal{V}_R, \varepsilon_{min})$, where $\mathcal{W}$ can be consistently replayed without any unnecessary synchronization overhead. Here, $\mathcal{G}_{min}$ can be constructed by removing all redundant edges in $\varepsilon_{col}$, that is, by executing a transitive reduction algorithm on $\mathcal{G}_{col}$.

A definition of a problem to be solved is, given a workload modeled as the initial graph $\mathcal{G}_{ini}=(\mathcal{V}_R, \varepsilon_{ses})$, generate a compact dependency graph $\mathcal{G}=(\mathcal{V}_R, \varepsilon)$ efficiently such that $$\mathcal{G}^{tr} = \mathcal{G}_{col}^{tr}.$$

This means that the transitive reduction of the compact dependency graph $\mathcal{G}^{tr}$ should be equal to the transitive reduction of the collision dependency graph $\mathcal{G}_{col}$. The collision dependency graph $$\mathcal{G}_{col}^{tr}$$

is generated by considering both commit dependencies and object dependencies and ensuring that redundant edges are removed. In this context, collision dependencies account for dependencies due to both inter-session transitivity (IT) and object transitivity (OT), ensuring that all necessary dependencies across different sessions and within individual sessions are accurately captured. The goal is to ensure that the compact graph $\mathcal{G}$ retains all the necessary dependencies without the redundancy found in $\mathcal{G}^{tr}$.

Figure 5:
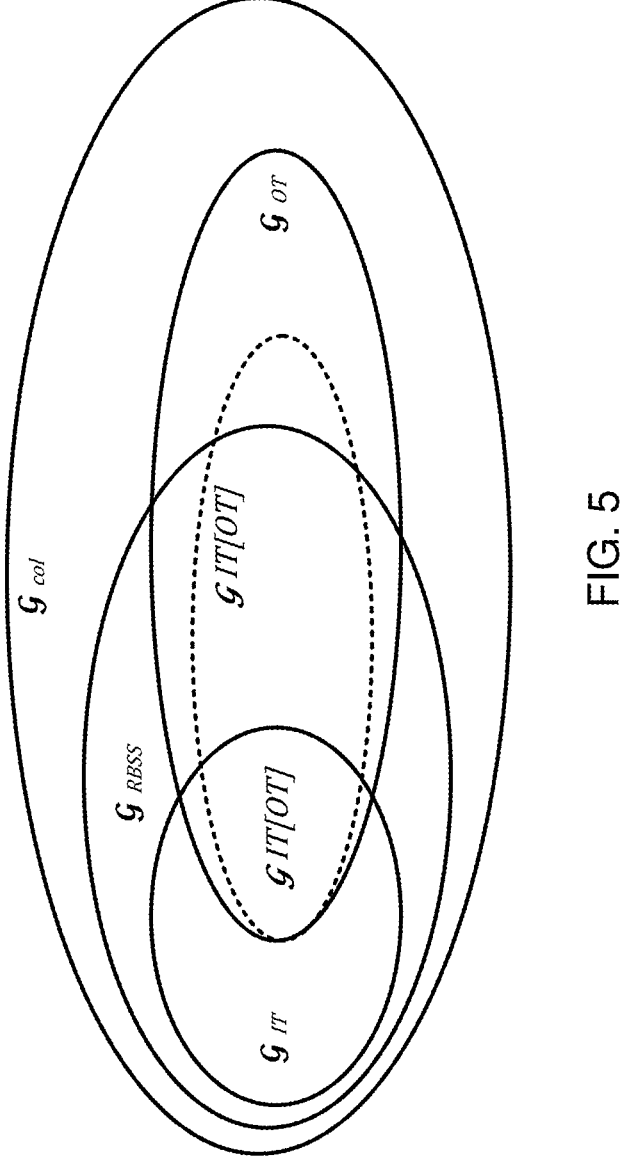
FIG. 5 is a Venn diagram illustrating relationships between types of dependency graphs that account for different types of edge redundancy.

An overview is provided for the dependency graphs based on the types of redundant edges that each dependency graph prunes from $\mathcal{G}_{col}$. FIG. 5 shows the containment (subset) relationships among the dependency graphs. Note that each dependency graph avoids specific types of redundant edges from $\mathcal{G}_{col}$. The IT-free graph $\mathcal{G}_{IT}$ and OT-free graph $\mathcal{G}_{OT}$ are those that respectively avoid redundant edges due to IT and OT, as explained in Example 1. $\mathcal{G}_{RbSS}$, generated by the generation step (i.e., before transitive reduction) is a special case of the IT-free graph. The OTIT-free graph $\mathcal{G}_{OTIT}$ is the one that avoids redundant edges due to either IT or OT. The IT[OT]-free graph $\mathcal{G}_{IT[OT]}$ prunes edges redundant due to OT first and then prunes the edges redundant due to IT. $E(\mathcal{G}_{IT[OT]})\supseteq E\mathcal{G}_{OTIT}$, as $\mathcal{G}_{IT[OT]}$ loses some IT connectivity after pruning redundant edges due to OT.

For example, in FIG. 1, $\mathcal{G}_{IT}$ removes all edges that are associated with only IT redundancy and both IT and OT redundancy, whereas $\mathcal{G}_{OT}$ removes edges associated with only OT redundancy and edges associated with both IT and OT redundancy. $\mathcal{G}_{OTIT}$ avoids all dotted edges except for ($r_5$, $r_{10}$). Note that ($r_5$, $r_{13}$) (E($\mathcal{G}_{OTIT}$) but ($r_5$, $r_{13}$)$\notin$ E($\mathcal{G}_{IT[OT]}$). This is because, $\mathcal{G}_{IT[OT]}$ removes ($r_6$, $r_9$) first and thus the path ($r_5$, $r_6$, $r_9$, $r_{11}$, $r_{13}$) disappears in the resulting dependency graph. The edge ($r_5$, $r_{10}$) is redundant due to reachability other than IT and OT. However, this type of redundancy is relatively infrequent; only 5.3% of the edges in $\mathcal{G}_{OTIT}$ are redundant in Table 1, above. Pruning those edges requires computing transitive closure. Thus, such edges can be addressed in the transitive reduction step rather than during the initial generation step.

For, the IT(k)-free graph, the concept of the k-forward path in two different sessions is defined. The IT(k)-free graph is then defined, using the k-forward path. Among the IT(k)-free graphs, two of the special graphs are discussed, the IT(1)-free graph and the IT($\infty$)-free graph.

In order to define redundant edges in Eco, but not in the IT(k)-free graph, the concept of the k-forward path is defined. Given two vertices, r in session s and r' in session s' (s$\neq$s'), a path $$(r, r_1^s, \ldots, r_i^s, r_1^{s'}, \ldots, r_k^{s'}, r')$$

(i$\geq$0, k$\geq$i+k$\geq$1) is called k-forward-path from r to r' in $\varepsilon_{col}\cup\varepsilon_{ses}$ where all $r^s$'s are in session s and $r^{s'}$'s are in session s'. Here, k is the length of the subpath consisting of vertices in session s'. Given an edge (r, r'), if there exists a k-forward-path from r to r', then (r, r') is redundant. This type of redundancy is referred to as inter-session transitivity (IT) because a k-forward path exists along requests in two different sessions (s and s'). For example, a path ($r_5$, $r_6$, $r_8$, $r_{12}$) in FIG. 1 is a 1-forward path from $r_5$ to $r_{12}$. Therefore, ($r_5$, $r^{12}$) is redundant, and can be pruned in the IT(1)-free graph.

A new redundancy-free dependency graph, the IT(k)-free graph, is defined using the k-forward-path. A redundancy-free dependency edge set is defined. For generality, it is defined over an arbitrary edge set $\varepsilon$: $IT_k(\varepsilon)=\{(r, r')\in |\exists$ i-forward path p from r to r' in $\varepsilon\cup\varepsilon_{ses}$, where 0$\leq$i$\leq$k$\}$. That is, every edge in $IT_k$ ($\varepsilon$) lacks any forward path of length k or less. Definition 1, below, defines the graph where the edge set is $IT_k(\varepsilon_{col})$:

Definition 1: An IT(k)-free graph $\mathcal{G}_{IT(k)}=(\mathcal{V}_R, \varepsilon_{IT(k)})$ for $\mathcal{G}_{ini}$ is a dependency graph where $\varepsilon_{IT(k)}=IT_k(\varepsilon_{col})$ The dependency graph $\mathcal{V}_{R\ RBSS}=(\mathcal{G}, \varepsilon_{RBSS})$, generated by the generation step (i.e., before transitive reduction) of the dependency graph generation algorithm, is in between $\mathcal{G}_{IT(0)}$ and $\mathcal{G}_{IT(1)}$ (i.e., $\varepsilon_{IT(1)} \subseteq \varepsilon_{RBSS} \subseteq \varepsilon_{IT(0)}$).

Although the $\mathcal{G}_{RBSS}$ provides higher replay concurrency than $\mathcal{G}_{total}$, it could have many redundant edges, resulting in severe overhead during replay. One can execute a transitive reduction algorithm on $\mathcal{G}_{RBSS}$. However, the overall performance of the dependency graph generation may be slow due to the high overhead of unnecessarily redundant edge generation and removal. For example, in Table 1, 99.6% of the edges in $\mathcal{G}_{RBSS}$ are redundant. There, a more compact dependency graph for efficient generation and transitive reduction is desirable.

The IT($\infty$)-free graph (simply denoted as the IT-free graph) is a general case of IT(k)-free graph where the edges do not have any forward paths of any length (i.e., k=$\infty$). The IT-free graph ensures the pruning of all redundant edges in two inter-sessions. For brevity, $IT_\infty(\varepsilon)$ is denoted as IT ($\varepsilon$).

Although the definition of IT can be generalized for three or more sessions, pruning such redundant edges may require expensive self-join operations over the edge set IT($\varepsilon$) being constructed so far. For example, consider constructing IT($\varepsilon$) for three sessions. Then, a three-way self-join is needed over IT($\varepsilon$) using quantifiers $E_1$, $E_2$, and $E_3$, where non-equi join conditions include "$E_1.src\_ts \le E_2.src\_ts$ AND $E_1.dst\_ts \ge E_2.dst\_ts$ AND $E_2.src\_sid < > E_3.dst\_sid$." This may be even more expensive than transitive closure.

Although the IT-free graph removes some redundant edges, many redundant edges remain, since the IT-free graph considers inter-session redundancy due to two sessions only. For example, in Table 1, 73.7% of the edges in the IT-free graph are still redundant. It is observed that the most redundant edges in the IT-free graph are due to the transitive property of collision-dependent edges where the source and the target vertex of each edge access the same object. This redundancy is referred to as object transitivity (OT). That is, OT captures important and dominant redundancy among multiple sessions, which can be also detected efficiently. In Table 1, 98% of the redundant edges in the IT-free graph have OT.

Another important type of redundancy-free dependency edge sets is defined, and is inspired by object transitivity-free (OT-free) edges. To define the OT-free edge set, a predicate is defined. Consider two requests r, r'$\in \mathcal{V}_{\mathcal{R}}$. The predicate access_obj(r, o) returns true if and only if o$\in$ r.objs. The OT-free graph is then defined in Definition 2:

Definition 2. An OT-free graph $\mathcal{G}_{OT}=(\mathcal{V}_{\mathcal{R}}, \varepsilon_{OT})$ for $\mathcal{G}_{ini}$ is a dependency graph where $\varepsilon_{OT}=OT(\varepsilon_{col})$ For example, in FIG. 1, the OT-free graph does not have $(r_6, r_9)$, since $(r_6, r_8, r_9)$ exists due to OT. In Definition 2, the set of collision-dependent edges or object o is:

$$C^o(\varepsilon_{col}) = \{(r, r') \in \varepsilon_{col} \mid access_{obj(r,o)} \wedge access\_obj(r', o)\}$$

In other words, the set includes all requests where both requests r and r' access the same object o. The set of object transitivity-free edges for object o is:

$$OT^o(\varepsilon_{col}) = \{(r,r') \in \varepsilon_{col} \exists \text{ a path}$$

$$p = (r, r_1'', \dots, r_n'', r')$$

(n$\ge$1) where all edges $$(r, r_1''), \dots, (r_n'', r') \in C^0(\varepsilon_{col})\}.$$

The path p is called an object transitive path.

In other words, the set includes all edges that are not part of any objective transitive path p, ensuring they are free from OT redundancy. The set of object transitivity-free edges is:

$$OT(\varepsilon_{col}) = \cap_{o \in O} OT^o(\varepsilon_{col})$$

That is, the set includes all edges that are object transitivity-free for all objects o in the workload O.

A more concise dependency graph, an OTIT-free graph, can be obtained by applying both IT($\varepsilon$) and OT($\varepsilon$) (i.e., removing both types of redundant edges). Among all possible compositions (i.e., IT(OT($\varepsilon$)), OT(IT($\varepsilon$)), and OT($\varepsilon$) $\cap$IT($\varepsilon$)), the most concise dependency graph is one without any redundant edges, which are absent in either the OT-free or the IT-free graph.

The edge set of the OTIT-free graph is simply an intersection of the edge sets of OT-free and IT-free graphs, as defined in Definition 3. Note that the order of OT and IT is independent of the definition.

Definition 3. A OTIT-free graph $\mathcal{G}_{OTIT}=(\mathcal{V}_{\mathcal{R}}, \varepsilon_{OTIT})$ for $\mathcal{G}_{ini}$ is a dependency graph where $\varepsilon_{OTIT}=OT(\varepsilon_{col}) \cap IT (\varepsilon_{col})$.

While the OTIT-free graph is concise, it can incur relatively high costs in determining both IT($\varepsilon$) and OT($\varepsilon$) is computationally expensive. An IT[OT]-free graph, which can be obtained by applying IT($\varepsilon$) after OT($\varepsilon$), can be generated much more efficiently, while adding only a few more redundant edges compared to the OTIT-free graph (in TPC-C, 1.3% more). The IT[OT]-free graph is expressed in Definition 4

Definition 4. An JT[OT]-free graph $\mathcal{G}_{IT[OT]}=(\mathcal{V}_{\mathcal{R}}, \varepsilon_{IT[OT]})$ for $\mathcal{G}_{ini}$ is a dependency graph where $\varepsilon_{IT[OT]}=IT(OT (\varepsilon_{col}))$.

By changing the order of OT and IT, the OT[IT]-free graph can be obtained. However, the OT[IT]-free graph can be less efficient to generate compared to the IT[OT]-free graph, since computing $OT^o (\varepsilon_{IT})$ for each object o$\in$O can be computationally expensive.

Although various graphs can be used, and the $\mathcal{G}_{OTIT}$ graph is the smallest, the $\mathcal{G}_{IT[OT]}$ is typically useful, since it strikes a balance between redundancy removal/compactness and generation costs.

Example 10)—Example Provision of Output Determinism

Disclosed capture and replay algorithms can, at least under some scenarios, guarantee output determinism under transaction-level snapshot isolation. Transaction-level snapshot isolation prevents dirty read, non-repeatable read, and phantom reads. To help provide output determinism, the disclosed techniques seek to provide that 1) each replayed request r returns the same output as during the capture time, and 2) r changes the database state to be the same as it was during the capture time. It is assumed that a statement with the same input reading the same database state always results in the same output. In snapshot isolation, each transaction acquires its own snapshot with its start timestamp and reads (i.e., possibly by multiple statements) the snapshot of data committed before the timestamp. The transaction can be committed when no write conflict occurs.

To provide that replayed requests return the same output, each replayed transaction should see the same snapshot as for the original transaction during the capture time. For this, disclosed capture techniques record the snapshot timestamp of each transaction as the timestamps of its non-commit requests. In $\mathcal{G}_{col}$, the ordering between each non-commit request r and commit requests modifying some object in r.objs is preserved. During replay, a DRS tries to ensure that each non-commit request reads the snapshot of r.objs committed before its timestamp. With $\mathcal{G}_{col}$, the assurance that a request changes the database to its captured state is also provided, as commit requests with overlapping write sets are scheduled serially to avoid any write conflicts.

Note that some DBMSs, such as PostgreSQL, claim to support repeatable read isolation, but the phantom read is not allowed in the level, while others, such as SQL Server, hold shared locks on all data read by each statement until the transaction completes. In both cases, the read stability condition (i.e., repeatable read) is satisfied if the same concurrency control under the same isolation level is used for both capture and replay.

Disclosed techniques can also provide output determinism for weaker isolation levels, such as statement-level snapshot isolation. In statement-level snapshot isolation, each statement acquires its own snapshot with its snapshot timestamp and reads the data committed before the timestamp, thereby allowing non-repeatable or phantom reads. Unlike transaction-level snapshot isolation, the timestamp of each non-commit request is also captured. During replay, a DRS seeks to ensure that each non-commit request reads the snapshot of the objects committed before its timestamp. These correctness goals hold for all dependency graphs of the present disclosure. This is because removing redundant edges does not change the order of execution of requests.

For example, in FIG. 1, consider the redundant edge ($r_4$, $r_9$). If the edge is removed, $r_9$ still will be scheduled after $r_4$ due to the path ($r_4$, $r_8$, $r_9$). In databases, tables can be partitioned to improve performance and manageability. Partitioning divides a large table into smaller, more manageable pieces, called partitions, based on a partitioning key. Each partition can be processed independently, allowing for more efficient query execution and data management.

Partition-level dependency ensures that operations on specific partitions of a table are consistently ordered, similar to how table-level dependency ensures order for entire tables. This approach helps maintain output determinism, meaning the order of operations and the resulting output remain consistent and predictable.

Block-level and row-level dependencies operate on smaller units within a table, such as individual blocks or rows. While this granularity can provide fine control over data operations, it can also lead to inconsistencies during query replay because they lack the explicit partitioning information that guides the correct ordering of operations.

When a table is partitioned, the partitioning information is explicitly known. This allows the disclosed techniques to accurately identify the appropriate partitions for a query using this partitioning information. In contrast, block-level or row-level dependencies can be problematic because they do not have this explicit partitioning information, making it harder to ensure consistent and correct query execution.

Partition-level dependency, therefore, helps avoid the replay inconsistency problem that occurs with block-level or row-level dependency by leveraging known partitioning information to guide the scheduling of queries.

Commercial DBMSs typically support either hash-based or range-based partitioning. Thus, once a query is given, a disclosed DRS can identify all related partitions accessed by the query using partition pruning techniques. If a query contains predicates on non-partitioning keys, in some implementations, the DRS identifies all partitions of table R even if some partitions may not have tuples relevant to the query. That is, a disclosed DRS can take a conservative approach to guarantee correctness.

For example, consider a table R(A, B, C), range partitioned on A: {[1-10], [11-20], [21-30], . . . , [9990-10000]}. Assume that the two transactions shown below are serially executed at the capture time. Here, a transaction T1 uses a predicate on a non-partitioning key B, while a transaction T2 uses a predicate on the partitioning key A (i.e., A=1). Then, the SELECT request of T1 is associated with all partitions of R, while both requests (i.e., UPDATE and COMMIT requests) of T2 are associated with the first partition only (note that the COMMIT request of T1 is ignored, since T1 does not update any object). Thus, the SELECT request of T1 and the COMMIT request of T2 are correctly ordered in the dependency graph.

T1: SELECT * FROM R WHERE B<20; COMMIT;
T2: INSERT INTO R VALUES (1,5,20); COMMIT;

Example 11)—Example Operation of Repetitive Backward Session Scan (RBSS)

In order to help clarify advantages of the disclosed techniques, this Example describes how RBSS, discussed in Morfonios, et. al., "Consistent Synchronization Schemes for Workload Replay," Proceedings of the VLDB Endowment 4:12, pp. 1225-1236 (Aug. 1, 2011), generates a dependency graph $\mathcal{G}_{RBSS}$ from $\mathcal{G}_{ini}$. Note that RBSS refers to the generation algorithm, excluding the transitive reduction. The time complexity of RBSS and the relationship between $\mathcal{G}_{RBSS}$ and $\mathcal{G}_{IT(k)}$ are also provided.

RBSS generates the incoming edges of each request r'= $\mathcal{V}_R$, by iterating over every session s∈ S except for s'=r'.sid, and performing a backward scan with a time interval (rmin.ts, rmax.ts). RBSS stops the scan whenever a r collision-dependent to r' is found.

Assume that $r_{prev}$ is the previous request of r' in session s'. Then, $r_{max}$ is the earliest request after r' in session s, while $r_{min}$ is a request in session s which must wait for $r_{prev}$. Note that the edge ($r_{min}$, $r_{prev}$) needs to be generated before the generation of incoming edges of r'.

Figure 6:
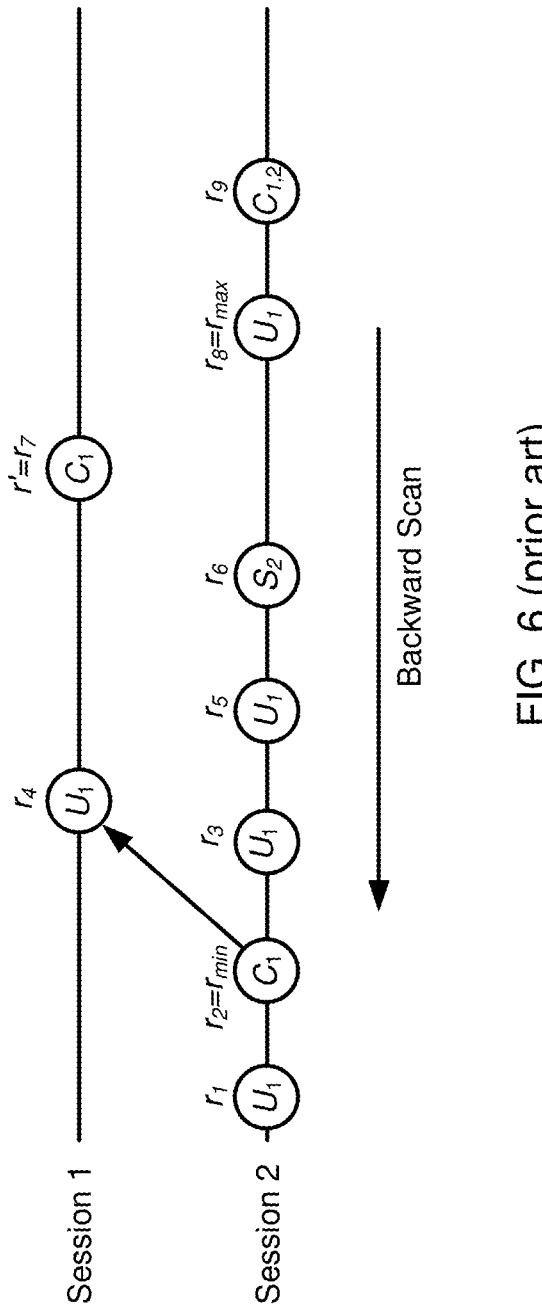
FIG. 6 is a diagram of a prior art technique for generating dependency graphs using a backward scan technique, and with limited removal of redundant edges in a generated dependency graph.

An explanation is provided as to how to compute the time interval of $r_7$ in FIG. 6. Since the edge ($r_2$, $r_4$) is generated $r_4$ is processed, $r_{min}$ is set to $r_2$. $r_{max}$ is set to $r_8$.

The time complexity of RBSS is $O(|\mathcal{V}_R|^2)$. It is assumed that requests are evenly distributed among sessions. Also, it is assumed that finding $r_{max}$ takes $$O\left(\log \frac{|\mathcal{V}_R|}{|S|}\right),$$

and all the other subprocedures take constant time. In the worst case, RBSS must access all preceding requests of r' in every session except for r'.sid (i.e., $r_{min}$ can be $r_0$). Thus, the overall time complexity is $$O\left(\sum_{i=1}^{|\mathcal{V}_R|}\left(i + |S| \cdot \log \frac{\mathcal{V}_R}{S}\right) - |S| \cdot \sum_{j=1}^{|\mathcal{V}_R|/|S|} j\right) = O(|\mathcal{V}_R|^2)$$

In order to analyze results using the time complexity analysis, a tighter bound is derived using a concept of the average backward distance, $d_{avg}$, an average number of requests to scan to find an incoming edge from a session for each request. Finally, $$O\left(|\mathcal{V}_{\mathcal{R}}| \cdot (|S|-1) \cdot \left(d_{avg} + \log \frac{|\mathcal{V}_{\mathcal{R}}|}{|S|}\right)\right)$$

is obtained as the time complexity of RBSS.

An explanation is provided in Lemma 1 for the relationship between the IT(k)-free graph and the dependency graph $\mathcal{G}_{RBSS} = (\mathcal{V}_{\mathcal{R}}, \varepsilon_{RBSS})$. RBSS prunes every edge (r, r') with a 0-forward path $$(r, \ldots, r_i^s, r')(i \geq 1)$$

(i.e., $\varepsilon_{RBSS} \subseteq \varepsilon_{IT(0)}$). Suppose that there is a 0-forward path $$(r, \ldots, r_i^s, r')(i \geq 1)$$

for (r, r') in $\mathcal{G}_{RBSS}$. Then, during the backward scan in session s to generate the incoming edges of r', RBSS must find $$r_i^s$$

and then stop.

An explanation is further provided to explain why RBSS fails to prune some edge $(r, r') \in \varepsilon_{col}$ with 1-forward path $$(r, r_1^s, \ldots, r', r_i^s, r_{prev}, r')$$

$(i \geq 0)$ (i.e., $\varepsilon_{IT(1)} \subseteq \varepsilon_{RBSS}$). As soon as $$(r_i^s, rprev)$$

is pruned from $\mathcal{G}_{RBSS}$, RBSS does not continue to prune the redundant edge (r, r') due to its 1-forward path. The following lemma shows the containment relationships among these dependency graphs.

Lemma 1. $\varepsilon_{IT(1)} \subseteq \varepsilon_{RBSS} \subseteq \varepsilon_{IT(0)}$.

Example 12)—Example Stateful Forward Scan Technique for Dependency Graph Generation This Example 8 describes an efficient dependency graph generation algorithm called SSFS, which obtains and uses state information states. An algorithm is described that can be used to generate the disclosed improved dependency graphs, accounting for IT and/or OT, using state information. It is then explained what states should be maintained and how to generate the dependency graph from the states for each type of dependency graph. SSFS can generate any dependency graph in in the present disclosure.

$\mathcal{V}_{\mathcal{R}}$ is considered as a sequence of vertices according to their timestamp. It is assumed that the timestamp t is assigned by a monotonically increasing logical timer ($t \geq 1$). A dependency graph generation algorithm takes $\mathcal{V}_{\mathcal{R}}$, processes the requests, and outputs a dependency relation $\varepsilon \in \{\varepsilon_{OT}, \varepsilon_{IT}, \varepsilon_{OTIT}, \varepsilon_{IT|OT|}\}$.

Algorithm 1 below describes SSFS. SSFS first initializes a current edge set incrementally appended (Line 1) and the states (Line 2). SSFS iterates over all requests r' in $\mathcal{V}_{\mathcal{R}}$ in increasing timestamp order (Line 3). For each request r', SSFS generates a set of the incoming edges of r', $\varepsilon_{r'}$, using states (Line 4) and then updates states (Line 5). Then SSFS appends the generated edge set to the current edge set (Line 6). At the end of the iteration, SSFS finally returns the generated dependency graph (Line 7).

| Algorithm 1: Stateful Single Forward Scan (SSFS) |
|---|
| Input: A workload $\mathcal{G}_{ini} = (\mathcal{V}_{\mathcal{R}}, \varepsilon_{ses})$, the dependency graph type $T_G$ |
| 1      $E_{curr} \leftarrow \emptyset$ // The current edge set |
| 2      states $\leftarrow \emptyset$ // The states |
| 3      for r' $\in \mathcal{V}_{\mathcal{R}}$ in increasing timestamp order do |
| 4          Er' $\leftarrow$ GenerateIncomingEdges (r', states, $T_G$ ) |
| 5          states $\leftarrow$ UpdateStates(r, states, $T_G$) |
| 6          $E_{curr} \leftarrow E_{curr} \cup E_{r'}$ |
| 7          return $(\mathcal{V}_{\mathcal{R}}, E_{curr} )$ |

In generating $\mathcal{G}_{IT}$, consider the current request r' of session s' at timestamp t. Since $\varepsilon_{IT(0)} \supseteq \varepsilon_{IT(k)}$ for any k>0, first, every edge (r, r') in $\varepsilon_{IT(0)}$ from each session s ($\neq$s') (Case k=0) if found, and then pruned it if there exists a k ($\geq$1)-forward path between r and r (Case k>0). That is, those not pruned must be in $\varepsilon_{IT(k)}$. For example, in FIG. 7, it is assumed that the current request to process is $r_7$ (=r'), i.e., a commit request. Then, from session 1, $(r_6, r_7) \in E_{IT(0)}$ is found, and not pruned, since there is no k-forward path from $r_6$ to $r_7$. On the other hand, from session 2, $(r_4, r_7) \in \varepsilon_{IT(0)}$ is found, and is pruned, since there is a 1-forward path ($r_4$, $r_5$, $r_7$).

Figures 8A, 8B:
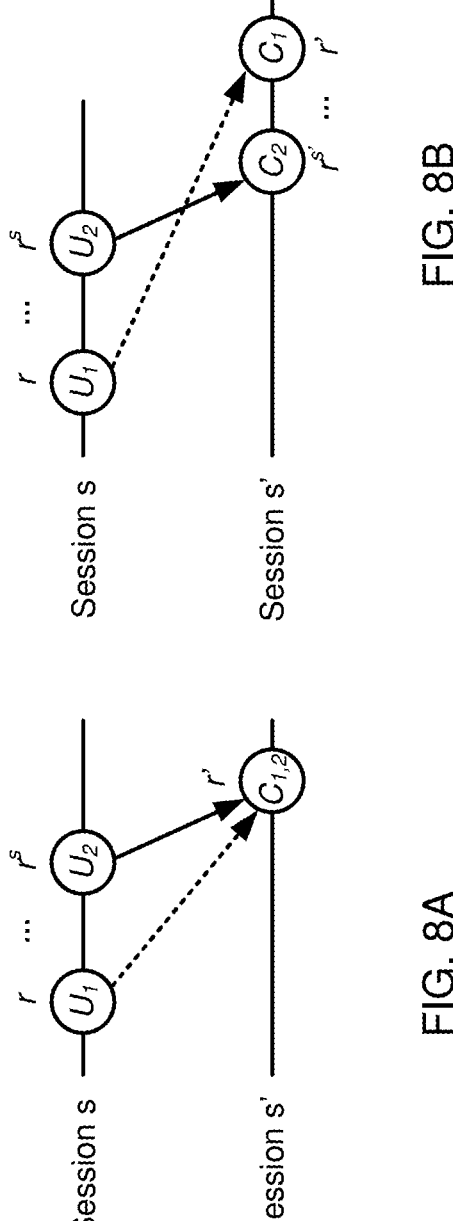
FIGS. 8A and 8B illustrate scenarios where a path is a subpath of longer path that includes one or more additional requests for database operations in a database session, which can be used in techniques for removing redundant edges from a dependency graph.

For each session s ($\neq$s'), to ensure that (r, r') $\in \varepsilon_{IT(0)}$ (Case k=0), r must be the latest collision-dependent request to r' in session s (see FIG. 8A). In other words, r is the most recent request in session ss that directly affects r'. Otherwise, there exists the latest collision-dependent request rs ($\neq$r) to r' in session s, and thus there exists a 0-forward path (r, . . . , r$^s$, r$^{s'}$, . . . , r'), contradicting the definition of $\varepsilon_{IT(0)}$.

For each edge (r, r') $\in \varepsilon_{IT(0)}$, to ensure that (r, r') $\in \varepsilon_{IT}$ (Case k$\geq$1), no edge (r$^s$, r$^{s'}$) $\in \varepsilon_{IT(0)}$ such that rs.sid=s, r$^s$.ts$\geq$r.ts, r$^{s'}$.sid=s'. and r$^{s'}$. ts<t, has been appended to the dependency graph being currently constructed (see FIG. 8B). In other words, there should not be another edge in $E_{It(0)}$ that starts from session s after r, and ends in session s' before t. Otherwise, there exists a k-forward path (r, . . . , r$^s$, r$^{s'}$, . . . , r'), which is contradictory to the definition of $\varepsilon_{IT(k)}$.

To generate the incoming edges for $\mathcal{G}_{IT}$, two nested tables are maintained as states: the session-wise collision requests ($\mathcal{SCR}$) and the latest appended edges between sessions ($\mathcal{LAE}$). SCR stores the latest non-commit and commit requests for every pair of (obj, SID).

Figure 7:
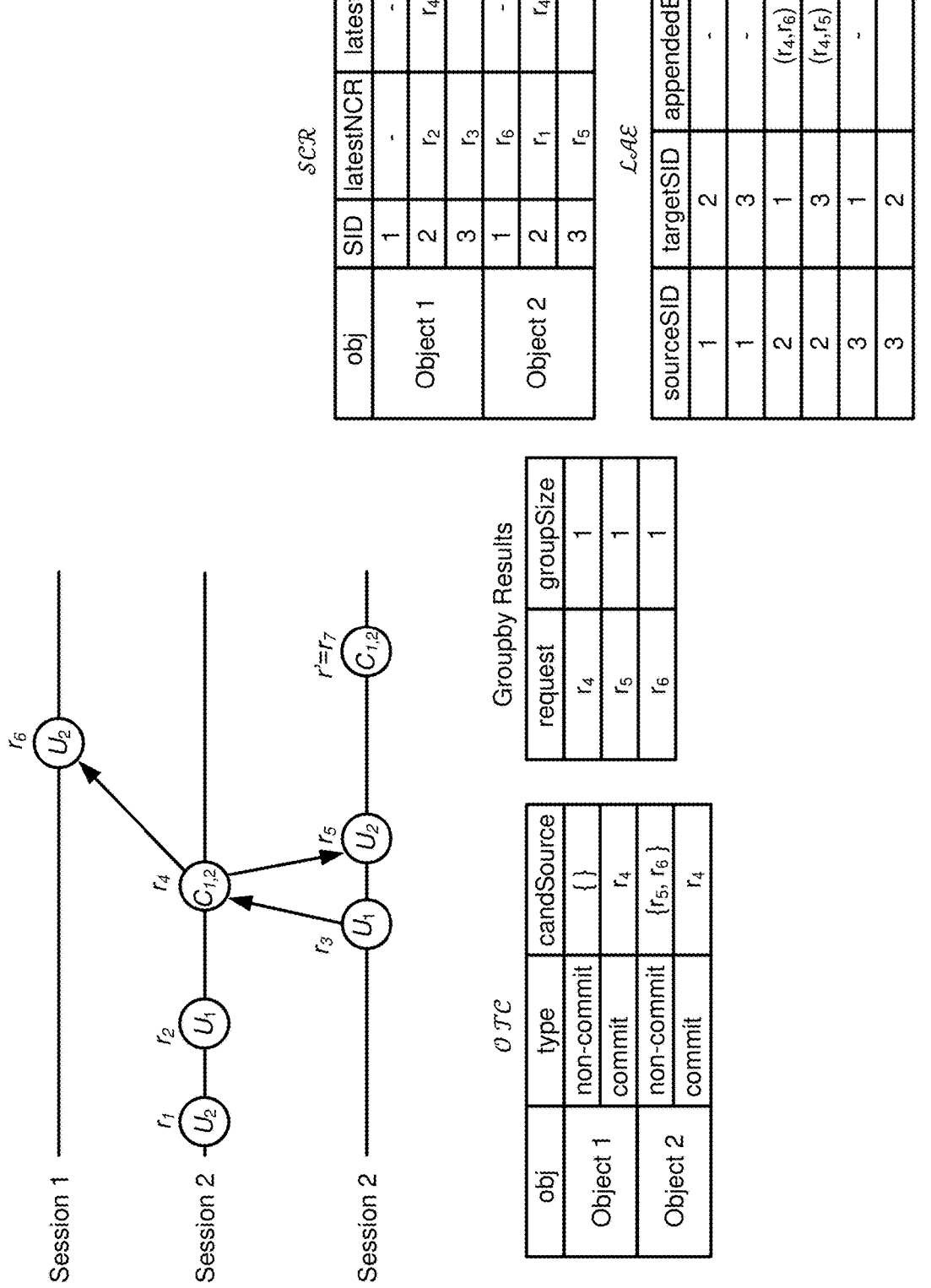
FIG. 7 illustrates an example set of requests for database operations in multiple database systems, and state information that can be maintained for use in generating dependency graphs according to techniques of the present disclosure.

Given an object o and a session s, the latest non-commit and commit requests accessing o in session s can be retrieved and updated using $\mathcal{SCR}$. $\mathcal{SCR}$ can be implemented in a two-dimensional array, enabling lookup and update operations to be performed in O(1). For example, when $r_7$(=r) in FIG. 7 is processed, $\mathcal{SCR}$ stores $r_2$ and $r_4$ as the latest non-commit and commit requests accessing object 1 in session 2, respectively. Likewise, $\mathcal{SCR}$ stores $r_1$ and $r_4$ as the latest non-commit and commit requests accessing object 2 in session 2, respectively.

$\mathcal{LAE}$ stores the most recently appended edge in $\varepsilon_{IT(0)}$ for every pair of sessions, supporting lookup and update as well. $\mathcal{LAE}$ can also be implemented in a two-dimensional array, enabling the operations to be performed in O(1). For example, in FIG. 7, the fourth tuple in $\mathcal{LAE}$ represents the most recently appended edge $(r_4, r_5)$ from session 2 to session 3.

A detailed algorithm is provided for generating the incoming edges of r' for $\mathcal{G}_{IT}$. Given r', for each pair (s, o) such that o∈r'.objs, the latest non-commit and commit requests from $\mathcal{SCR}$, that are collision-dependent to r', are retrieved.

Among all retrieved requests for r', if r' is a commit request, the latest request r in session s in O(|r'.objs|) is retrieved. In other words, the most recent request in the same session that accesses any of the same objects as r' is identified. Otherwise, the latest commit request r in session s is retrieved, meaning the most recent commit operation in the same session is found.

Then, since $(r, r') \in \varepsilon_{IT(0)}$, the latest appended edge $(r^s, r^{s'})$ is retrieved from $\mathcal{LAE}$ using s and s' in O(1). If not found, (r, r') is generated as a new edge. This means that a new dependency is created between r and r'.

Otherwise, if r.ts>$r^s$.ts, (r, r') is generated. This condition ensures that the new edge represents the latest dependency between the requests. After (r, r') is generated, the tuple in $\mathcal{LAE}$ is updated using s and s' in O(1) by replacing the value of the appendedEdge column with (r, r'). This update ensures that $\mathcal{LAE}$ reflects the most recent dependency between the sessions.

For each request, updating $\mathcal{SCR}$ requires O(|r'.objs|), while updating $\mathcal{LAE}$ requires O(|S|), the upper bound of the number of incoming edges of r'. This means that the time complexity for updating the session collision record depends on the number of objects accessed by the request, and the time complexity for updating the latest appended edge depends on the number of sessions.

An analysis of the time and space complexity of edge generation and state maintenance for $\mathcal{G}_{IT}$ is described. For each request r', every tuple in $\mathcal{SCR}$ whose object ID∈r'.objs is scanned. Scanning each tuple in $\mathcal{SCR}$ takes O(1) and thus, the time complexity of incoming edge generation for r' is O(|r'.objs·||S|). The time complexity of maintaining $\mathcal{SCR}$ and $\mathcal{LAE}$ for each request is O(max (|r'.objs|, |S|)). If |S| and |r'.objs| are regarded as constants, O(1) is guaranteed for each request. The space complexity for the states is O(|S|·|O|+|S|²), since the sizes of $\mathcal{SCR}$ and $\mathcal{LAE}$ are O(|S|·|O|) and O(|S|²), respectively.

The generation of $\mathcal{G}_{OT}$ is now explained. Consider the current request r' accessing r'.objs at timestamp t. To ensure that $(r, r') \in \varepsilon_{OT}$, for every object o∈r.objs∩r'.objs, must be no object transitive path from r to r'. Otherwise, $(r, r') \notin OT°(C°(\varepsilon_{col}))$ for some o (see the definitions of $OT^O$ and $C_o$). Therefore, for each o∈r'.objs, the candidate source vertices of the incoming edges of r' for $OT°(C°(\varepsilon_{col})$ are found. The incoming edges are then grouped by vertex ID to prune any candidate vertex r whose group size does not match |r'. objs∩r.objs|.

In other words, the candidate source vertices are identified by checking which vertices have edges that match the objects accessed by the current request r'. These vertices are then grouped and compared to ensure that only those with the correct number of matching objects are retained.

For example, in FIG. 7, it is assumed that the current request is $r_7$ (=r'). For object 1, $r_4$ is found, since $(r_4, r_7) \in OT^1(C^1(\varepsilon_{col})$. Similarly, for object 2, $r_5$ and $r_6$ are found, since $(r_5, r_7)$, $(r_6, r_7) \in OT^2(C^2(\varepsilon_{col})$. The results of the group by operation are also shown in FIG. 7. Since the group size for $r_4(=1) \neq |r_7.objs \cap r_4.objs|(=2)$, $r_4$ is discarded. However, since the group size for $r_5(=1)=|r_7.objs \cap r_5.objs|$, $(r_5, r_7)$ is generated. Similar to $(r_5, r_7)$, $(r_6, r_7)$ is generated. In other words, the group-by operation ensures that only the relevant source vertices that match the objects accessed by the current request are retained for generating new edges.

Figure 9B:
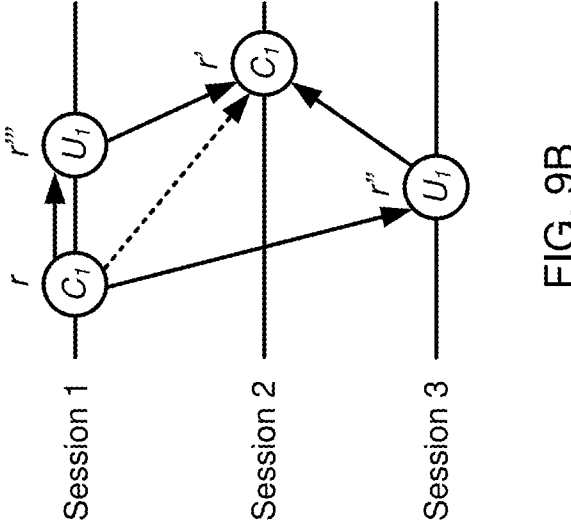
FIGS. 9A and 9B illustrate scenarios where a path is a subpath of a longer path that includes one or more additional requests for database operations associated with a given object, which can be used in techniques for removing redundant edges from a dependency graph.
Figure 9A:
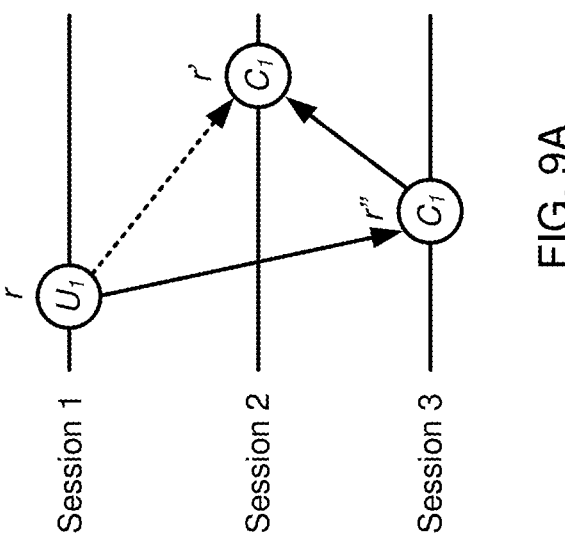

To ensure that $(r, r') \in OT°(C°(\varepsilon_{col})$ for o∈r'.objs, if r' is a non-commit request, r must be the latest commit request accessing o. Otherwise, there exists the latest commit request r"(≠r) accessing o, and thus there exists an object transitive path (r, r", r'), which is contradictory to the definition of $OT°(C°(\varepsilon_{col})$. When r' is a commit request, r can be either a commit request or a non-commit request accessing o. If r is a commit request, r must be the latest request accessing o, and there must be no non-commit request r" accessing o after r. Otherwise, an object transitive path (r, r", r') exists (see FIG. 9A). If r is a non-commit request, there exists no commit request r" accessing o after r. Otherwise, an object transitive path (r, r", r') exists (see FIG. 9B). In other words, for r to be a valid source vertex for generating an edge to r', it must be the latest request that accesses the same object o without any conflicting or more recent requests creating a transitive path.

A set of non-commit requests accessing o after the latest commit request accessing o is referred to as a latest non-commit request set for object o. For example, in FIG. 7, $\{r_5, r_6\}$ is the latest non-commit request set for object 2.

A temporary table can be used to store all retrieved candidate source vertices for r'.objs. The candidate sources vertices are then grouped by the source vertex ID. If the group size of a source vertex r is equal to (r.objs∩r'.objs)| (i.e., for every o∈r.objs∩r'.objs, $(r, r') \in O$ $OT°(C°(\varepsilon_{col})$, the edge (r, r') is generated as a new edge to $\mathcal{G}_{OT}$. Otherwise, r is discarded.

States for $\mathcal{G}_{OT}$ are now described. To generate the incoming edges for $\mathcal{G}_{OT}$, a nested table, the OT-free candidate table, is maintained $\mathcal{OTC}$ (obj, type, candSource) as a state. Each tuple in $\mathcal{OTC}$ corresponds to every pair of (obj, type). If type is COMMIT, candSource stores the latest commit request accessing obj.

Otherwise, candSource stores the latest non-commit request set for obj. Given an object o and the request type, the latest commit request accessing o or the latest non-commit request set for o can be retrieved and updated depending on type, using $\mathcal{OTC}$. For example, when processing $r_7(=r')$ in FIG. 7, for obj=2 and type=NON-COMMIT, $\mathcal{OTC}$ stores $\{r_5, r_6\}$ as a latest non-commit request set. For obj=2 and type=COMMIT, $\mathcal{OTC}$ stores the latest commit request $r_4$.

A detailed algorithm for generating the incoming edges of r' for $\mathcal{G}_{OT}$ is described. For each request r', SSFS iterates over every object o∈r'.objs. Given an object o, when r' is a non-commit request, the latest commit request accessing o using (o, COMMIT) in O(1) is retrieved. If r' is a commit request, the latest non-commit request set using (o, NON-COMMIT) is retrieved. If such a non-commit request does not exist, the latest commit request accessing o using (o, COMMIT) is retrieved in O(1). All retrieved requests are stored in a temporary table, and the candidate source vertices group by vertex ID. Every edge (r, r') is generated such that r's group size is the same as |r.objs∩r'.objs|.

An analysis of the time and space complexity of edge generation and state maintenance is provided for $\mathcal{G}_{OT}$. For each request r', the candidate source vertices from $\mathcal{OTC}$ are scanned and stored in the temporary table. If r' is a non-commit request, it takes O (|r'.objs|). Otherwise, it takes $O(\Sigma_{o \in r'.objs} \#$ of non-commit request in for o) of non-commit requests in $\mathcal{OTC}$ for o). If the temporary table is implemented as a hash table, the group by operation takes $\tilde{O}(max|r'. obs|, \Sigma_{o \in r'.objs} \#$ of non-commit request in $\mathcal{OTC}$ for o). The time complexity of maintaining $\mathcal{OTC}$ for each request is O(|r'.objs|). The space complexity of $\mathcal{OTC}$ and the temporary table is $O(\Sigma_{r \in \mathcal{V}_{\mathcal{R}}}(|r'.obs|))$.

The following discussion describes the generation of $\mathcal{G}_{IT[OT]}$. A naive implementation to generate $\varepsilon_{IT[OT]}$ is to 1) generate the incoming edges of r' in $\varepsilon_{OT}$ and 2) prune some of the edges not in $\varepsilon_{IT[OT]}$. This approach is comparatively inefficient, because it involves generating many unnecessary edges only to prune them later.

Instead of generating all incoming edges of r' in $\varepsilon_T$, some candidate requests from $\mathcal{OTC}$ are discarded to avoid generating the edges not in $\varepsilon_{IT(0)}$. Specifically, for each (obj, type) pair, only the latest request for each session is maintained. By keeping only the most recent request for each session that accesses a particular object and type, the number of candidate requests is significantly reduced. This optimization helps ensure that only relevant edges are considered, thus making the process more efficient.

As a result, the number of stored requests is significantly smaller than the original OTC, reducing storage requirements by maintaining a smaller set of candidate requests. Since only the latest requests are kept the complexity and size of the candidate set are minimized. Note that $\mathcal{SCR}$ is not needed for generating $\mathcal{G}_{IT[OT]}$.

Sessions are iterated over first, and the number of the latest candidate source vertex r counted for a given session. This way, it can be determined if the group size corresponding to r equals |(r'.objs∩r.objs)|, which avoids the hash-based grouping. By iterating over sessions and counting the relevant source vertices, it is possible to determine the group size directly. This optimization eliminates the need for hash-based grouping, further speeding up the process.

This optimization enables a significant speedup, compared to generating the edges for $\varepsilon_{OT}$ only. Thus, generating $\varepsilon_{IT[OT]}$ achieves both size and efficiency. That is, this approach not only reduces the number of edges generated, but also improves the speed of the process. By focusing on relevant candidate requests and eliminating unnecessary steps, the generation of $\varepsilon_{IT[OT]}$ becomes more efficient in terms of both computational resources and time.

After generating the incoming edges of r' for $\varepsilon_{OT} \cap \varepsilon_{IT(0)}$), the edges are pruned using $\mathcal{LAE}$ (see case k>0 in the discussion of generating $\mathcal{G}_{IT}$). That is, once the relevant incoming edges for r' are identified in the intersection of $\varepsilon_{OT}$ and $\varepsilon_{IT(0)}$, any redundant edges are pruned using the $\mathcal{LAE}$ table. This step ensures that only necessary edges are retained in the final dependency graph.

Example 13)—Example Parallelization of SSFS

This Example describes a parallel version of SSFS (PSSFS). The example focuses on the IT[OT]-graph, since the other types of graphs can be obtained similarly.

Parallelization includes three phases: 1) partitioning, 2) local dependency graph generation, and 3) hierarchical merging. In the partitioning phase, PSSFS divides the workload into p partitions by time range, $P_1$, $P_2$, . . . , $P_p$, and generates their induced subgraphs, $\mathcal{G}_{ini}[P_1]$, $\mathcal{G}_{ini}[P_2]$, . . . , $\mathcal{G}_{ini}[P_p]$.

Here, a subgraph H is an induced subgraph of $\mathcal{G}$ if it includes all of the edges in E($\mathcal{G}$) that have both endpoints are both in V(H). In other words, H contains exactly the same edges between its vertices as $\mathcal{G}$ does. Given a set of vertices V(H), $\mathcal{G}$[V(H)] denotes H. Then, PSSFS generates a local IT[OT]-free dependency graph $\mathcal{G}_{i(o)}$ for $\mathcal{G}_{ini}[P_i]$ by using the serial SSFS. This means that each local dependency graph is created by applying the SSFS algorithm to a subset of vertices in the initial graph. Here, $\mathcal{G}_{i(m)}$ represents the i-th local dependency graph at the m-th level in the hierarchical merge. The states that need to be maintained additionally for efficient hierarchical merging will be described. These states help keep track of necessary information for combining graphs. Finally, the local dependency graphs are hierarchically merged by generating missing inter-partition edges while maintaining the states. In other words, the merging process connects the different local graphs by adding edges between partitions to form a comprehensive global graph.

Except for the last level, the merged dependency graph is also regarded as a local dependency graph. For example, given local dependency graphs $\mathcal{G}_{i(m)}$ and $\mathcal{G}_{i+1(m)}$, the merged dependency graph of these two is also another local dependency graph for $V(\mathcal{G}_{i(m)}) \cup V(\mathcal{G}_{i+1(m)})$ for all i<[log$_2$p], as described in sites.google.com/view/systemx-replay. This means that the process of merging continues until all partitions are combined into the final global dependency graph.

While this may appear to be a typical parallel algorithm, there are three challenges. A first challenge is, what were the missing edges in local dependency graphs compared to the global dependency graph? This means identifying edges that are not present in the local graphs but are necessary in the global graph. A second challenge is, does any edge in local dependency graphs need to be removed? This involves ensuring that no extra edges are present that would violate the global graph's dependencies. A third challenge is, what states should be maintained additionally for efficient merging? These are the additional pieces of information needed to correctly combine local graphs into the global graph.

Lemma 2 answers the first two questions. Lemma 2 states that 1) missing edges are inter-partition ones only, which means that the edges missing from the local graphs are only those that connect different partitions; and 2) there is no risk of removing any edge from the local dependency graphs, indicating that the local graphs already contain all necessary intra-partition edges.

Lemma 2. Given the global dependency graph $\mathcal{G}_{IT[OT]}$, every local dependency graph $\mathcal{G}_i$ is the induced subgraph of the global dependency graph using all vertices in $\mathcal{G}_i$. That is, $\mathcal{G}_i = \mathcal{G}_{IT[OT]}[V(\mathcal{G}_i)]$.

As in SSFS, an explanation is provided of what states should be maintained to generate candidate inter-partition edges for the merged OT-free graph efficiently. These states help in tracking the required dependencies to ensure accurate merging of graphs. An explanation is then provided of how to prune redundant edges from them using the definition of the k-forward path. This ensures that no unnecessary edges remain, maintaining the graph's efficiency. Thus, the resulting graph satisfies all conditions of the IT[OT]-free graph.

Consider the merge of two local dependency graphs $\mathcal{G}_i$ and $\mathcal{G}_{i+1}$. Then, for any inter-partition edge (r, r') between the two graphs, r∈V($\mathcal{G}_i$) and r'∈V($\mathcal{G}_{i+1}$). In other words, an inter-partition edge connects a vertex in one local dependency graph to a vertex in the adjacent local dependency graph. Lemma 3 states a set of candidate destination vertices {r'} for the inter-partition edges, which should be maintained. These candidate vertices are potential endpoints for edges that connect different partitions in the merged graph.

Lemma 3. Consider merging two local dependency graphs $\mathcal{G}_i$ and $\mathcal{G}_{i+1}$. Then, for some object o, every vertex r' in the set of destination vertices in all inter-partition edges in the merged dependency graph is either the first commit request accessing o or a non-commit request accessing o before the first commit request accessing o in $\mathcal{G}_{i+1}$. This means that the destination vertices for inter-partition edges are key requests that ensure proper dependency relationships across partitions.

Based on Lemma 3, a new state is maintained as a hash table where its key is an object $o \in O$, and its value is the pair of the first commit request and the first non-commit requests before the first commit request for o. This hash table helps efficiently track the necessary requests to generate correct inter-partition edges.

Here, it is not required to store all non-commit requests before the first commit request for each session for o, which is analogous to the optimization explained in the discussion of generating $\mathcal{G}_{OT}$. This optimization reduces the amount of data stored by keeping only the most relevant requests. Then, for every $o \in O$, the set of candidate destination vertices are union of both sets in the value of the hash table for key o. This means combining the tracked commit and non-commit requests to form the full set of potential destination vertices.

Now, an explanation is provided of how to generate inter-partition edges of the merged OT-free graph with this additional state. This means combining the tracked commit and non-commit requests to form the full set of potential destination vertices. Consider merging two local dependency graphs, $\mathcal{G}_i$ and $\mathcal{G}_{i+1}$. All candidate destination vertices for $\mathcal{G}_{i+1}$ can then be obtained. Since the incoming edges of $\mathcal{G}_{IT[OT]}$ will be generated as in SSFS, these candidate destination vertices can be sorted by timestamp order. Sorting by timestamp helps ensure the correct order of dependencies is maintained. Using the first commit request and the non-commit requests before the commit request for every $o \in O$ for $\mathcal{G}_i$, PSSFS generates the edges in $\mathcal{G}_{IT[OT]}$ as in SSFS, discarding any edge whose both vertices are in $V(\mathcal{G}_{i+1})$. This ensures that only relevant inter-partition edges are included, and edges that do not span partitions are ignored.

To generate the inter-partition edges for the merged IT[OT]-free graph, any inter-partition edge (r, r') are pruned in $\varepsilon_{OT}$ if there is a k-forward path from r to r'. This pruning step ensures that only the necessary edges are retained, avoiding redundant paths. As explained in the discussion of generating $\mathcal{G}_{IT[OT]}$, r must be the latest collision-dependent to r'. This means r should be the most recent request in its session that affects r'. Therefore, the source vertex of the incoming edge for r' in the session s must be the latest candidate source vertex $r \in V(\mathcal{G}_i)$ in a different session. This ensures that the edge reflects the most recent dependency relationship. To prune out (r, r') such that a k-forward path from r to r' exists and all the edges in the path are in OT(E($\mathcal{G}_{col}[V(\mathcal{G}_i) \cup V(\mathcal{G}_{i+1})]$)) using the states, the following Lemma 4 is provided. This ensures that redundant inter-partition edges are efficiently identified and removed. It is straightforward to prove by the definition of the IT-free graph.

Lemma 4. An edge (r, r')∈ OT(E($\mathcal{G}_{col}[V(\mathcal{G}_i) \cup V(\mathcal{G}_{i+1})]$)) is pruned if and only if there exists another edge $(r^s, r^{s'}) \in$ OT(E($\mathcal{G}_{col}[V(\mathcal{G}_i) \cup V(\mathcal{G}_{i+1})]$)) such that $r^s$.sid=r.sid$\wedge r^s$.ts≥r.ts and $r^{s'}$.sid=r'.sid$\wedge$rs.ts≤r'.ts.

According to Lemma 4, $(r^s, r^{s'})$ is found to check if the inter-partition edge (r, r') needs to be pruned. This involves determining if the edge is redundant based on the presence of a k-forward path. If any of the following cases is satisfied, it is pruned: 1) $r^s, r^{s'} \in V(\mathcal{G}_i)$, this means both vertices are in the same local graph; 2) $r^s \in V(\mathcal{G}_i)$ and $r_s \in V(\mathcal{G}_{i+1})$, this means the vertices are in different local graphs; or 3) r, r'∈ $V(\mathcal{G}_{i+1})$, this means both vertices are in the next local graph.

When the first case holds, a k-forward path $$(r, r_1^s, \dots, r_i^s, r_1^{s'}, \dots, r_k^{s'}, r')$$

(i≥0, k≥1) such that $$r_i^s = r^s \text{ and } r_1^{s'} = r^{s'}$$

exists. In other words, there is a direct path through intermediate vertices connecting r to r', making the edge redundant. That is, such (r, r') must not be in IT(OT($\varepsilon_{col}$)). The other cases also hold according to the definition of the k-forward path. This means that similar logic applies, ensuring that redundant edges are pruned based on the presence of paths through intermediate vertices.

The first case is checked by using the $\mathcal{LAE}$ of $\mathcal{G}_i$, since $(r^s, r^{s'})$ has been generated for $\mathcal{G}_1$. This ensures that any edges within the same local graph are correctly identified and pruned. The second case is also checked by $\mathcal{LAE}$ of $\mathcal{G}_i$, since the candidate destination vertices are processed in increasing timestamp order. This ensures that any edges between different local graphs are correctly identified and pruned. For the third case, an additional state is maintained, the first appended edges between sessions ($\mathcal{FAE}$). This helps track the first edges added between different sessions in the next local graph. This case is checked by $\mathcal{FAE}$ for $\mathcal{G}_{i+1}$.

After generating inter-partition edges between $\mathcal{G}_i$ and $\mathcal{G}_{i+1}$, PSSFS merges all states. This step combines the information from both local graphs to form a unified global state.

Now an explanation of how to parallelize the transitive reduction is provided. Any parallel transitive reduction algorithm which supports local transitive reduction and hierarchical merge can be used. This involves breaking down the transitive reduction process into smaller, manageable parts that can be processed in parallel. For computing transitive reduction $\mathcal{G}_{IT[OT]}^{tr}$ of $\mathcal{G}_{IT[OT]}$, the transitive closure $\mathcal{G}_{IT[OT]}^{tc}$ is calculated. The transitive closure represents all direct and indirect paths in the graph. Here, an edge (r, r')∈E($\mathcal{G}_{IT[OT]}^{tc}$) if and only if there is a path from r to r' in $\mathcal{G}_{IT[OT]}$.

For each vertex v, a set of vertices reachable to v is maintained as a state. This helps track all possible paths from each vertex, facilitating the transitive reduction process. During the merge phase, the transitive closure for the merged dependency graph is updated, since inter-partition edges are also generated. This ensures that the global state accurately reflects all dependencies after merging. Instead of updating the state for all vertices in $\mathcal{V}_{\mathcal{R}}$, the state is updated for 1) the requests in $\mathcal{SCR}$, 2) the first commit request for each obj; 3) non-commit requests accessing obj before the first commit request accessing obj for every object obj; and 4) the first and the last requests for each session. This targeted update reduces computational overhead by focusing only on key vertices that affect the dependency graph. Updating the state for those vertices only is sufficient, since the additional edges are generated between those vertices during the merge phase. This ensures that the critical dependencies are accurately maintained without unnecessary computations.

Example 10—Example Dependency Graph Generation and Replay Operations

FIG. 10A is a flowchart of a process 1000 of replaying database operations using a dependency graph using state information. At 1004, information regarding a database workload is received. The workload includes a plurality of requests for one or more database operations. The information includes a timestamp of the given request, a request type for the given request, a set of one or more objects accessed by the given request, and, optionally, a session identifier that identifies a session in which the request was made.

Respective state information for given requests of the plurality of requests is generated at 1008 during a forward scan of the plurality of requests from the information regarding the database workload. The state information includes either or both of two categories of information. A first category of information includes, for an object of the set of one or more objects accessed by the given request, for one or more sessions of a plurality of sessions, an identifier of a latest commit request for the object and a set of non-commit requests accessing the object of the set of one or more objects after the latest commit request for the object. In a second category, when the information regarding the database workload includes a session identifier, the information includes, for respective pairs of sessions of the plurality of sessions, for a source session and a target session of a respective pair of sessions, a latest edge between a request in the source session and a request in the target session.

At 1012, a dependency graph for the plurality of requests is generated using the state information produced during the forward scan.

Finally, at 1016, the system replays at least a portion of the requests for database operations in the workload. The order of replay is determined based at least in part on the dependency graph.

FIG. 10B provides a flowchart of a process 1030 for replaying requests for database operations using a dependency graph that accounts for inter-session transitivity. At 1034 a plurality of requests for database operations in a workload are determined. A dependency graph for the plurality of requests is generated at 1038. The generating includes removing paths between requests in different sessions represented in the workload. These paths are subpaths of longer dependency graph paths that span multiple sessions of the different sessions and include at least one intermediate request. At 1042, at least a portion of the requests for database operations in the workload are replayed. The order of replay is determined at least in part from the dependency graph.

FIG. 10C provides a flowchart of a process 1050 for replaying requests for database operations using a dependency graph that accounts for object transitivity. At 1054, a plurality of requests for database operations in a workload are determined. A dependency graph for the plurality of requests for database operations is generated at 1058. The generating includes removing from the dependency graph paths between requests that access a common object. These removed paths are subpaths of a longer dependency graph path between requests that access the common object and include at least one intermediate request. At 1062, at least a portion of the requests for database operations in the workload are replayed. The order of replay is determined at least in part from the dependency graph.

Example 11—Additional Examples

Example 1 provides a computing system that includes at least one hardware processor, at least one memory coupled to the at least one hardware processor, and one or more computer-readable storage media storing computer-executable instructions. When executed, these instructions cause the computing system to perform operations. These operations include receiving information regarding a database workload. The database workload comprises a plurality of requests for one or more database operations. The information includes, for given requests of the plurality of requests, a timestamp of the given request, a request type for the given request, a set of one or more objects accessed by the given request, and, optionally, a session identifier that identifies a session in which the request was made.

From the information regarding the database workload, respective state information for given requests of the plurality of requests is generated during a forward scan of the plurality of requests. The respective state information includes one or both of: for an object of the set of one or more objects accessed by the given request, for one or more sessions of a plurality of sessions, an identifier of a latest commit request for the object and a set of non-commit requests accessing the object of the set of one or more objects after the latest commit request for the object; or when the information regarding the database workload comprises a session identifier, for respective pairs of sessions of the plurality of sessions, for a source session and a target session of a respective pair of sessions, a latest edge between a request in the source session and a request in the target session. A dependency graph for the plurality of requests is generated using the state information generated during the forward scan. At least a portion of the requests for database operations in the workload is replayed in an order determined based at least in part on the dependency graph.

Example 2 is the computing system of Example 1, where the respective state information includes for an object of the set of one or more objects accessed by the given request, for one or more sessions of a plurality of sessions, an identifier of a latest commit request for the object and a set of non-commit requests accessing the object of the set of one or more objects after the latest commit request for the object.

Example 3 is the computing system of Example 2, where the respective state information includes, for respective pairs of sessions of the plurality of sessions, for a source session and a target session of a respective pair of sessions, a latest edge between a request in the source session and a request in the target session.

Example 4 is the computing system of Example 2 or Example 3, with the operations further including, during generation of the dependency graph, for given requests of the plurality of requests in order of increasing timestamps: determining whether an edge between a session of the latest request and the given request is present in a first set of edges and: when the edge is not present in the first set of edges, adding to a second set of edges an edge between the latest request and the given request; or when the edge is present in the first set of edges, and the timestamp of the latest request is greater than the timestamp of a request in the edge, replacing the edge with an edge between the latest request and the given request.

Example 5 is the computing system of any of Examples 1-4, where the respective state information includes, for respective pairs of sessions of the plurality of sessions, for a source session and a target session of a respective pair of sessions, a latest edge between a request in the source session and a request in the target session.

Example 6 is the computing system of any of Examples 1-5, where the generating respective state information is based on a single forward scan of the plurality of requests.

Example 7 is the computing system of any of Examples 1-6, with the operations further including, during generation of the dependency graph, for given requests of the plurality of requests in order of increasing timestamps: determining whether the given request is a commit request, wherein: when the given request is not a commit request, retrieving from the state information a latest commit request for the respective object; or when the given request is a commit request, retrieving from the state information a set of non-commit requests accessing the object of the set of one or more objects after the latest commit request for the object; determining a set of a plurality of candidate requests from the state information, wherein given candidate requests of the set of a plurality of candidate requests access a common object with the given request; for respective candidate requests of the set of candidate requests, determining a number of objects accessed by a respective candidate request; and when the number of objects accessed by a respective candidate request is equal to a number of objects commonly accessed by the respective candidate request and the given request, adding to the dependency graph an edge between respective candidate request and the given request.

Example 8 is the computing system of any of Examples 1-7, where generating the dependency graph further includes: partitioning the plurality of requests by time range to provide partitioned requests; processing the partitioned requests in parallel to generate local dependency graphs; and merging the local dependency graphs hierarchically to generate a global dependency graph.

Example 9 describes a method, implemented in a computing system that includes at least one hardware processor and at least one memory coupled to the at least one hardware processor. The method includes determining a plurality of requests for database operations in a workload, generating a dependency graph for the plurality of requests by removing paths between requests in different sessions represented in the workload, where such paths are subpaths of longer dependency graph paths that span multiple sessions of the different sessions and include at least one intermediate request, and replaying at least a portion of the requests for database operations in the workload in an order determined at least in part from the dependency graph.

Example 10 is the method of Example 9, where generating a dependency graph further includes: during the generating a dependency graph, removing from the dependency graph paths between requests of the plurality of requests that access a common object that are subpaths of longer dependency graph path between requests of the plurality of requests that access the common object and include at least one intermediate request.

Example 11 is the method of Example 9 or Example 10, with the operations further including, after generating the dependency graph: removing from the dependency graph paths between requests of the plurality of requests that access a common object that are subpaths of longer dependency graph path between requests that access the common object and include at least one intermediate request.

Example 12 is the method of any of Examples 9-11, where the generating a dependency graph uses state information maintained during a single forward scan of the plurality of requests for database operations.

Example 13 is the method of Example 12, where generating the dependency graph further includes: partitioning the plurality of requests by time range; processing the partitioned requests in parallel to generate local dependency graphs; and merging the local dependency graphs hierarchically to generate a global dependency graph.

Example 14 is the method of Example 12 or Example 13, where the state information includes, for an object of a set of one or more objects accessed by a given request of the plurality of requests, for one or more sessions of the plurality of sessions, an identifier of a latest commit request for the object and a set of non-commit requests accessing the object of the set of one or more objects after the latest commit request for the object.

Example 15 is one or more non-transitory computer-readable storage media that include computer-executable instructions. When executed by a computing system that includes at least one hardware processor and at least one memory coupled to the at least one hardware processor, the computing system is caused to performed a number of operations. The operations include determining a plurality of requests for database operations in a workload, generating a dependency graph for the plurality of requests for database operations by removing from the dependency graph paths between requests that access a common object that are subpaths of a longer dependency graph path between requests that access the common object and include at least one intermediate request, and replaying at least a portion of the requests for database operations in the workload in an order determined at least in part from the dependency graph.

Example 16 is the one or more computer-readable storage media of Example 15, where, during the generation of a dependency graph, paths between requests in different sessions represented in the workload are removed. These paths are subpaths of longer dependency graph paths that span multiple sessions of the different sessions and include at least one intermediate request.

Example 17 is the one or more computer-readable storage media of Example 15 or Example 16, where, after generating the dependency graph, paths between requests in different sessions represented in the workload are removed. These paths are subpaths of longer dependency graph paths that span multiple sessions of the different sessions and include at least one intermediate request.

Example 18 is the one or more computer-readable storage media of any of Examples 15-17, where the generation of a dependency graph uses state information maintained during a single forward scan of the plurality of requests for database operations.

Example 19 is the one or more computer-readable storage media of Example 18, where the plurality of requests are partitioned by time range, the partitioned requests are processed in parallel to generate local dependency graphs, and the local dependency graphs are merged hierarchically to generate a global dependency graph.

Example 20 is the one or more computer-readable storage media of Example 18 or Example 19, wherein the state information includes, for an object of a set of one or more objects accessed by a given request of the plurality of requests, for one or more sessions of the plurality of sessions, an identifier of a latest commit request for the object and a set of non-commit requests accessing the object of the set of one or more objects after the latest commit request for the object.

Example 12—Computing Systems

Figure 11:
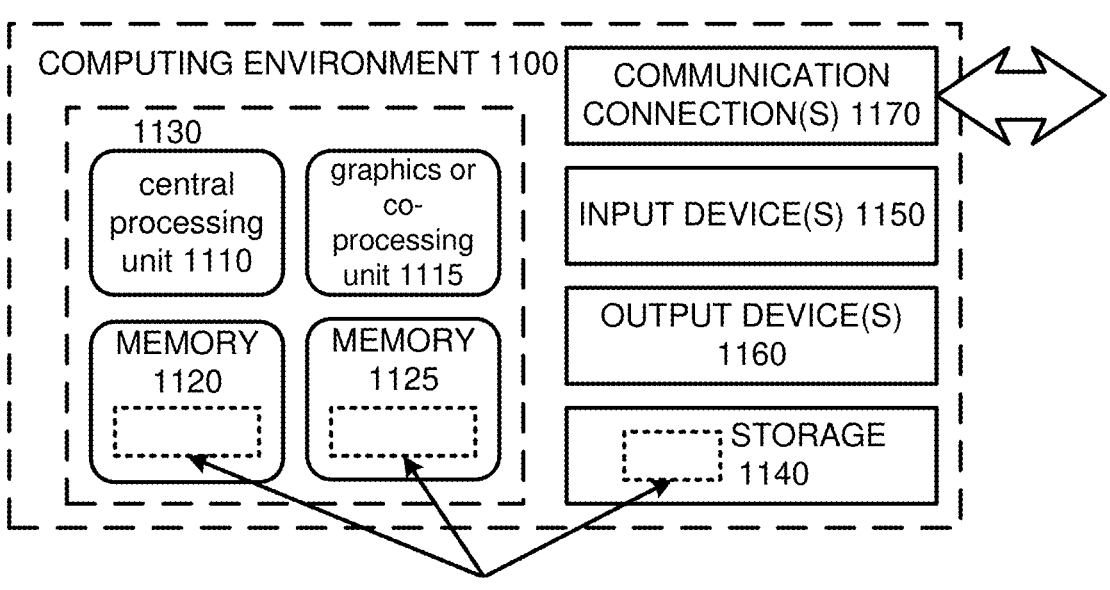
FIG. 11 is a diagram of an example computing system in which some described embodiments can be implemented.

FIG. 11 depicts a generalized example of a suitable computing system 1100 in which the described innovations may be implemented. The computing system 1100 is not intended to suggest any limitation as to scope of use or functionality of the present disclosure, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions, such as for implementing techniques describes in Examples 1-11. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s) 1110, 1115. The memory 1120, 1125 stores software 1180 implementing one or more innovations described herein, in the form of computer-executable instructions suitable for execution by the processing unit(s) 1110, 1115. The memory 1120, 1125, may also store database data.

A computing system 1100 may have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100. In some cases, the operating system can manage, or assist in managing, query language execution threads or job execution threads.

The tangible storage 1140 may be removable or non-removable, and includes magnetic disks, magnetic tapes or cassettes, CD-ROMs, DVDs, or any other medium which can be used to store information in a non-transitory way and which can be accessed within the computing system 1100. The storage 1140 stores instructions for the software 1120 implementing one or more innovations described herein.

The input device(s) 1150 may be a touch input device such as a keyboard, mouse, pen, or trackball, a voice input device, a scanning device, or another device that provides input to the computing system 1100. The output device(s) 1160 may be a display, printer, speaker, CD-writer, or another device that provides output from the computing system 1100.

The communication connection(s) 1170 enable communication over a communication medium to another computing entity, such as another database server. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 13—Cloud Computing Environment

Figure 12:
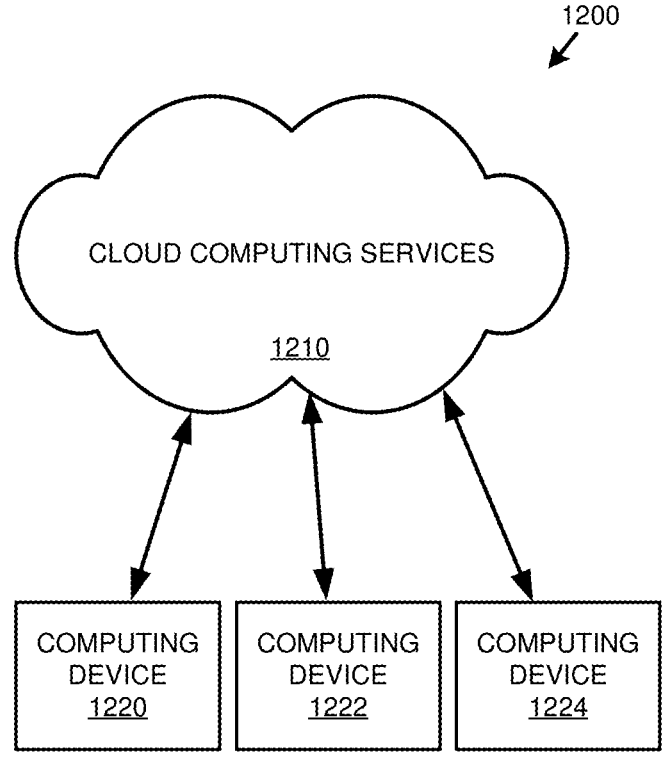
FIG. 12 is an example cloud computing environment that can be used in conjunction with the technologies described herein.

FIG. 12 depicts an example cloud computing environment 1200 in which the described technologies can be implemented. The cloud computing environment 1200 comprises cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 are utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operators (e.g., data processing, data storage, and the like).

Example 14—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 11, computer-readable storage media include memory 1120 and 1125, and storage 1140. The term computer-readable storage media does not include signals and carrier waves. In addition, the term computer-readable storage media does not include communication connections (e.g., 1170).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
at least one hardware processor;
at least one memory coupled to the at least one hardware processor; and
one or more computer-readable storage media storing computer-executable instructions, that, when executed, cause the computing system to perform operations comprising:
receiving information regarding a database workload, the database workload comprising a plurality of requests for one or more database operations, the information comprising, for given requests of the plurality of requests: (1) a timestamp of the given request; (2) a request type for the given request; and (3) a set of one or more objects accessed by the given request;
from the information regarding the database workload, generating respective state information for given requests of the plurality of requests during a forward scan of the plurality of requests, the respective state information comprising one or both of:
(1) for an object of the set of one or more objects accessed by the given request, for one or more sessions of a plurality of sessions, an identifier of a latest commit request for the object and a set of non-commit requests accessing the object of the set of one or more objects after the latest commit request for the object; or
(2) when the information regarding the database workload further comprises a session identifier, for respective pairs of sessions of the plurality of sessions, for a source session and a target session of a respective pair of sessions, a latest edge between a request in the source session and a request in the target session;
generating a dependency graph for the plurality of requests using the state information resulting from the forward scan, wherein, based on the state information representing multiple requests of the plurality of requests, at least one dependency relationship represented in the state information is selected from among multiple possible dependency relationships for representation in the dependency graph, wherein dependency relationships determined to be redundant in view of other selected dependency relationships are excluded from the dependency graph; and
replaying at least a portion of the requests for database operations in the database workload in an order determined based at least in part on the dependency graph, wherein the order enforces ordering constraints defined by dependency relations selected for representation in the dependency graph based at least in part on the state information representing multiple requests of the plurality of requests.

2. The computing system of claim 1, wherein the respective state information comprises for an object of the set of one or more objects accessed by the given request, for one or more sessions of the plurality of sessions, an identifier of a latest commit request for the object and a set of non-commit requests accessing the object of the set of one or more objects after the latest commit request for the object.

3. The computing system of claim 2, wherein the respective state information comprises, for respective pairs of sessions of the plurality of sessions, for a source session and a target session of a respective pair of sessions, a latest edge between a request in the source session and a request in the target session.

4. The computing system of claim 2, the operations further comprising, during generation of the dependency graph, for given requests of the plurality of requests in order of increasing timestamps:

determining whether an edge between a session of the latest request and the given request is present in a first set of edges and:

(1) when the edge is not present in the first set of edges, adding to a second set of edges an edge between the latest request and the given request; or (2) when the edge is present in the first set of edges, and the timestamp of the latest request is greater than the timestamp of a request in the edge, replacing the edge with an edge between the latest request and the given request.

5. The computing system of claim 1 wherein the respective state information comprises, for respective pairs of sessions of the plurality of sessions, for a source session and a target session of a respective pair of sessions, a latest edge between a request in the source session and a request in the target session.

6. The computing system of claim 1, wherein the generating respective state information is based on a single forward scan of the plurality of requests.

7. The computing system of claim 1, the operations further comprising, during generation of the dependency graph, for given requests of the plurality of requests in order of increasing timestamps:

determining whether the given request is a commit request, wherein:

(1) when the given request is not a commit request, retrieving from the state information a latest commit request for the respective object; or (2) when the given request is a commit request, retrieving from the state information a set of non-commit requests accessing the object of the set of one or more objects after the latest commit request for the object;

determining a set of a plurality of candidate requests from the state information, wherein given candidate requests of the set of a plurality of candidate requests access a common object with the given request;

for respective candidate requests of the set of candidate requests, determining a number of objects accessed by a respective candidate request; and when the number of objects accessed by a respective candidate request is equal to a number of objects commonly accessed by the respective candidate request and the given request, adding to the dependency graph an edge between respective candidate request and the given request.

8. The computing system of claim 1, wherein generating the dependency graph further comprises:

partitioning the plurality of requests by time range to provide partitioned requests;

processing the partitioned requests in parallel to generate local dependency graphs; and merging the local dependency graphs hierarchically to generate a global dependency graph.

9. A method, implemented in a computing system comprising at least one hardware processor and at least one memory coupled to the at least one hardware processor, the method comprising:

receiving recorded information describing a plurality of requests for database operations in a workload, the database workload comprising a plurality of requests for one or more database operations, the recorded information comprising, for given requests of the plurality of requests: (1) a timestamp of the given request; (2) a request type for the given request; and (3) a set of one or more database objects accessed by the given request;

generating state information for the plurality of requests during a forward scan of recorded information describing the workload, the state information representing relationships among multiple requests of the plurality of requests, the state information including, for an object of the set of one or more database objects accessed by a given request, an identifier of a latest commit request for the object and a set of non-commit requests accessing the object after the latest commit request;

generating a dependency graph for the plurality of requests using the state information resulting from the forward scan, wherein, based at least in part on the state information representing relationships among multiple requests of the plurality requests, dependency relationships are selected for representation in the dependency graph and dependency relationships determined to be redundant are excluded by removing paths between requests in different sessions represented in the workload, wherein such paths are subpaths of longer dependency graph paths that span multiple sessions of the different sessions and include at least one intermediate request; and replaying at least a portion of the requests for database operations in the workload in an order determined at least in part from the dependency graph, wherein the order enforces ordering constraints defined by the dependency relationships selected for representation in the dependency graph.

10. The method of claim 9, wherein generating a dependency graph further comprises:

during the generating a dependency graph, removing from the dependency graph paths between requests of the plurality of requests that access a common object that are subpaths of longer dependency graph path between requests of the plurality of requests that access the common object and include at least one intermediate request.

11. The method of claim 9, the operations further comprising, after generating the dependency graph:

removing from the dependency graph paths between requests of the plurality of requests that access a common object that are subpaths of longer dependency graph path between requests that access the common object and include at least one intermediate request.

12. The method of claim 9, wherein the generating a dependency graph uses state information maintained during a single forward scan of the plurality of requests for database operations.

13. The method of claim 12, wherein generating the dependency graph further comprises:

partitioning the plurality of requests by time range;

processing the partitioned requests in parallel to generate local dependency graphs; and merging the local dependency graphs hierarchically to generate a global dependency graph.

14. The method of claim 12, wherein the state information comprises, for an object of a set of one or more objects accessed by a given request of the plurality of requests, for one or more sessions of the plurality of sessions, an identifier of a latest commit request for the object and a set of non-commit requests accessing the object of the set of one or more objects after the latest commit request for the object.

15. One or more non-transitory computer-readable storage media comprising:

computer executable instructions that, when executed by a computing system comprising at least one hardware processor and at least one memory coupled to the at least one hardware processor, cause the computing system to receive recorded information describing a database workload, the database workload comprising a plurality of requests for one or more database operations in a workload, the database workload comprising a plurality of requests for one or more database operations, the recorded information comprising, for given requests of the plurality of requests: (1) a timestamp of the given request; (2) a request type for the given request; and (3) a set of one or more database objects accessed by the given request;

computer executable instructions that, when executed by the computing system, cause the computing system to generate state information for the plurality of requests during a forward scan of recorded information describing the workload, the state information representing relationships among multiple requests of the plurality of requests, the state information including, for an object of the set of one or more database objects accessed by a given request, an identifier of a latest commit request for the object and a set of non-commit requests accessing the object after the latest commit request;

computer executable instructions that, when executed by the computing system, cause the computing system to generate a dependency graph for the plurality of requests for database operations using the state information resulting from the forward scan, wherein, based at least in part on the state information representing relationships among multiple requests of the plurality requests, dependency relationships are selected for representation in the dependency graph and dependency relationships determined to be redundant are excluded by removing from the dependency graph paths between requests that access a common object that are subpaths of a longer dependency graph path between requests that access the common object and include at least one intermediate request; and computer executable instructions that, when executed by the computing system, cause the computing system to replay at least a portion of the requests for database operations in the workload in an order determined at least in part on the dependency graph, wherein the order enforces ordering constraints defined by the dependency relationships selected for representation in the dependency graph.

16. The one or more non-transitory computer-readable storage media of claim 15, wherein the computer-executable instructions that cause the computing system to generate a dependency graph further comprise:

computer-executable instructions that, when executed by the computing system, cause the computing system to, during the generating a dependency graph, remove paths between requests in different sessions represented in the workload, wherein such paths are subpaths of longer dependency graph paths that span multiple sessions of the different sessions and include at least one intermediate request.

17. The one or more non-transitory computer-readable storage media of claim 15, further comprising:

computer-executable instructions that, when executed by the computing system, cause the computing system to, after generating the dependency graph, remove paths between requests in different sessions represented in the workload, wherein such paths are subpaths of longer dependency graph paths that span multiple sessions of the different sessions and include at least one intermediate request.

18. The one or more non-transitory computer-readable storage media of claim 15, wherein the computer-executable instructions that cause the computing system to generate a dependency graph use state information maintained during a single forward scan of the plurality of requests for database operations.

19. The one or more non-transitory computer-readable storage media of claim 18, wherein the computer-executable instructions that cause the computing system to generate a dependency graph further comprise:

computer-executable instructions that, when executed by the computing system, cause the computing system to partition the plurality of requests by time range;

computer-executable instructions that, when executed by the computing system, cause the computing system to process the partitioned requests in parallel to generate local dependency graphs; and computer-executable instructions that, when executed by the computing system, cause the computing system to merge the local dependency graphs hierarchically to generate a global dependency graph.

20. The one or more non-transitory computer-readable storage media of claim 18, wherein the state information comprises, for an object of a set of one or more objects accessed by a given request of the plurality of requests, for one or more sessions of the plurality of sessions, an identifier of a latest commit request for the object and a set of non-commit requests accessing the object of the set of one or more objects after the latest commit request for the object.

* * * * *